(12) United States Patent
Purdy

(10) Patent No.: US 12,436,284 B1
(45) Date of Patent: Oct. 7, 2025

(54) INFERRING OBJECT ATTRIBUTES FROM TRACK ASSOCIATIONS

(71) Applicant: Zoox, Inc., Foster City, CA (US)

(72) Inventor: Scott M. Purdy, Lake Forest Park, WA (US)

(73) Assignee: Zoox, Inc., Foster City, CA (US)

( * ) Notice: Subject to any disclaimer, the term of this patent is extended or adjusted under 35 U.S.C. 154(b) by 581 days.

(21) Appl. No.: 17/846,721

(22) Filed: Jun. 22, 2022

(51) Int. Cl.
| | |
|---|---|
| *G01S 17/42* | (2006.01) |
| *B60W 30/095* | (2012.01) |
| *G01S 7/48* | (2006.01) |
| *G01S 7/481* | (2006.01) |
| *G01S 17/894* | (2020.01) |
| *G01S 17/931* | (2020.01) |

(52) U.S. Cl.
CPC ......... *G01S 17/42* (2013.01); *B60W 30/0956* (2013.01); *G01S 7/4808* (2013.01); *G01S 7/4817* (2013.01); *G01S 17/894* (2020.01); *G01S 17/931* (2020.01); *B60W 2420/403* (2013.01); *B60W 2420/408* (2024.01); *B60W 2554/4042* (2020.02)

(58) Field of Classification Search
CPC ...... G01S 17/42; G01S 17/931; G01S 17/894; G01S 7/4808; G01S 7/4817; B60W 30/0956; B60W 2554/4042; B60W 2420/408; B60W 2420/403
See application file for complete search history.

(56) References Cited

U.S. PATENT DOCUMENTS

| | | |
|---|---|---|
| 10,345,437 B1 | 7/2019 | Russell et al. |
| 11,628,855 B1 * | 4/2023 | Pradhan ............... G01S 17/58 701/24 |
| 11,644,834 B2 | 5/2023 | Ditty |
| 12,005,922 B2 | 6/2024 | Misu |
| 12,013,919 B2 * | 6/2024 | Zhu ................... G01S 13/931 |
| 12,017,657 B2 * | 6/2024 | Lin ................... G06V 40/103 |
| 12,026,956 B1 * | 7/2024 | Purdy ................. G06T 7/50 |
| 12,145,592 B2 * | 11/2024 | Zhong ................ G06V 10/82 |

(Continued)

OTHER PUBLICATIONS

Office Action for U.S. Appl. No. 17/846,780, mailed on Jul. 2, 2024, Purdy, "Object Tracking Based On Temporal Data Attribute Inferences", 15 pgs.

(Continued)

*Primary Examiner* — Peter D Nolan
*Assistant Examiner* — Wae L Louie
(74) *Attorney, Agent, or Firm* — Lee & Hayes, P.C.

(57) ABSTRACT

Techniques for determining attributes associated with objects represented in temporal sensor data. In some examples, the techniques may include receiving sensor data including a representation of an object in an environment. The sensor data may be generated by a temporal sensor of a vehicle and, in some instances, a trajectory of the object or the vehicle may contribute to a distortion in the representation of the object. For instance, a shape of the representation of the object may be distorted relative to an actual shape of the object. The techniques may also include determining an attribute (e.g., velocity, bounding box, etc.) associated with the object based at least in part on a difference between the representation of the object and another representation of the object (e.g., in other sensor data) or the actual shape of the object.

20 Claims, 14 Drawing Sheets

(56) References Cited

U.S. PATENT DOCUMENTS

| | | |
|---|---|---|
| 2007/0058836 A1 | 3/2007 | Boregowda et al. |
| 2017/0140229 A1 | 5/2017 | Ogata et al. |
| 2019/0222736 A1 | 7/2019 | Wheeler et al. |
| 2019/0286916 A1 | 9/2019 | Yan et al. |
| 2019/0318177 A1* | 10/2019 | Steinberg .............. G01S 17/931 |
| 2019/0324147 A1 | 10/2019 | Day et al. |
| 2019/0370606 A1 | 12/2019 | Kehl et al. |
| 2020/0057160 A1 | 2/2020 | Li et al. |
| 2020/0099824 A1* | 3/2020 | Benemann ............. G01S 17/86 |
| 2020/0150235 A1* | 5/2020 | Beijbom ............... G01S 7/4808 |
| 2020/0184027 A1* | 6/2020 | Dolan ................. G01S 13/931 |
| 2020/0284883 A1* | 9/2020 | Ferreira ............... G01S 7/4815 |
| 2021/0063578 A1* | 3/2021 | Wekel ................. G01S 17/894 |
| 2021/0086789 A1 | 3/2021 | Oyama |
| 2021/0096359 A1* | 4/2021 | Klam ..................... G01S 17/89 |
| 2021/0326608 A1 | 10/2021 | Yoshimi |
| 2022/0057806 A1* | 2/2022 | Guo ........................... G06T 7/97 |
| 2022/0073090 A1 | 3/2022 | Kakeshita et al. |
| 2022/0092291 A1* | 3/2022 | Lai ........................... G01S 17/42 |
| 2022/0107414 A1 | 4/2022 | Maheshwari et al. |
| 2022/0119012 A1 | 4/2022 | Agon et al. |
| 2022/0121884 A1 | 4/2022 | Zadeh et al. |
| 2022/0284627 A1 | 9/2022 | Johnson et al. |
| 2022/0342047 A1* | 10/2022 | Moscovici ............ G01S 17/931 |
| 2023/0033297 A1 | 2/2023 | Vandapel et al. |
| 2023/0042750 A1 | 2/2023 | Kumar et al. |
| 2023/0058731 A1* | 2/2023 | Purdy ................. G01S 7/4808 |
| 2023/0091924 A1* | 3/2023 | Dowdall ................. G01S 17/42 <br> 701/26 |
| 2023/0095410 A1* | 3/2023 | Costea .................... G01S 17/89 <br> 356/5.01 |
| 2023/0109909 A1* | 4/2023 | Meng .................... G01S 13/931 <br> 342/54 |
| 2023/0135234 A1* | 5/2023 | Wang .................... G06V 10/774 <br> 382/103 |
| 2023/0168358 A1 | 6/2023 | Cieslar et al. |
| 2023/0184946 A1 | 6/2023 | Yoo |
| 2023/0236432 A1 | 7/2023 | Muhassin et al. |
| 2023/0281527 A1 | 9/2023 | Cella et al. |
| 2023/0322208 A1 | 10/2023 | Rojas et al. |
| 2023/0408656 A1* | 12/2023 | Lu ........................... G01S 17/89 |
| 2024/0302529 A1 | 9/2024 | Hussonnois et al. |
| 2024/0395049 A1* | 11/2024 | Chemali ................ G06V 20/58 |

OTHER PUBLICATIONS

Office Action for U.S. Appl. No. 17/846,694, mailed on Sep. 23, 2024, Purdy, "Inferring Object Attributes From Distortions in Temporal Data", 24 pages.

Office Action for U.S. Appl. No. 17/846,756, dated Oct. 15, 2024, 13 pages.

Office Action for U.S. Appl. No. 17/846,721, mailed on Dec. 10, 2024, Purdy, "Inferring Object Attributes From Track Associations", 27 pages.

* cited by examiner

INFERRING OBJECT ATTRIBUTES FROM TRACK ASSOCIATIONS

BACKGROUND

Sensors can be used in various applications for data generation. Many of today's sensors are either instantaneous sensors that capture data instantaneously or temporal sensors that capture data over a period of time. In contrast to instantaneous sensors, however, temporal sensors can commonly experience latency-related issues when they are used to capture information about dynamic scenes. For instance, a representation of a dynamic object in temporal sensor data can be distorted relative to an actual shape of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
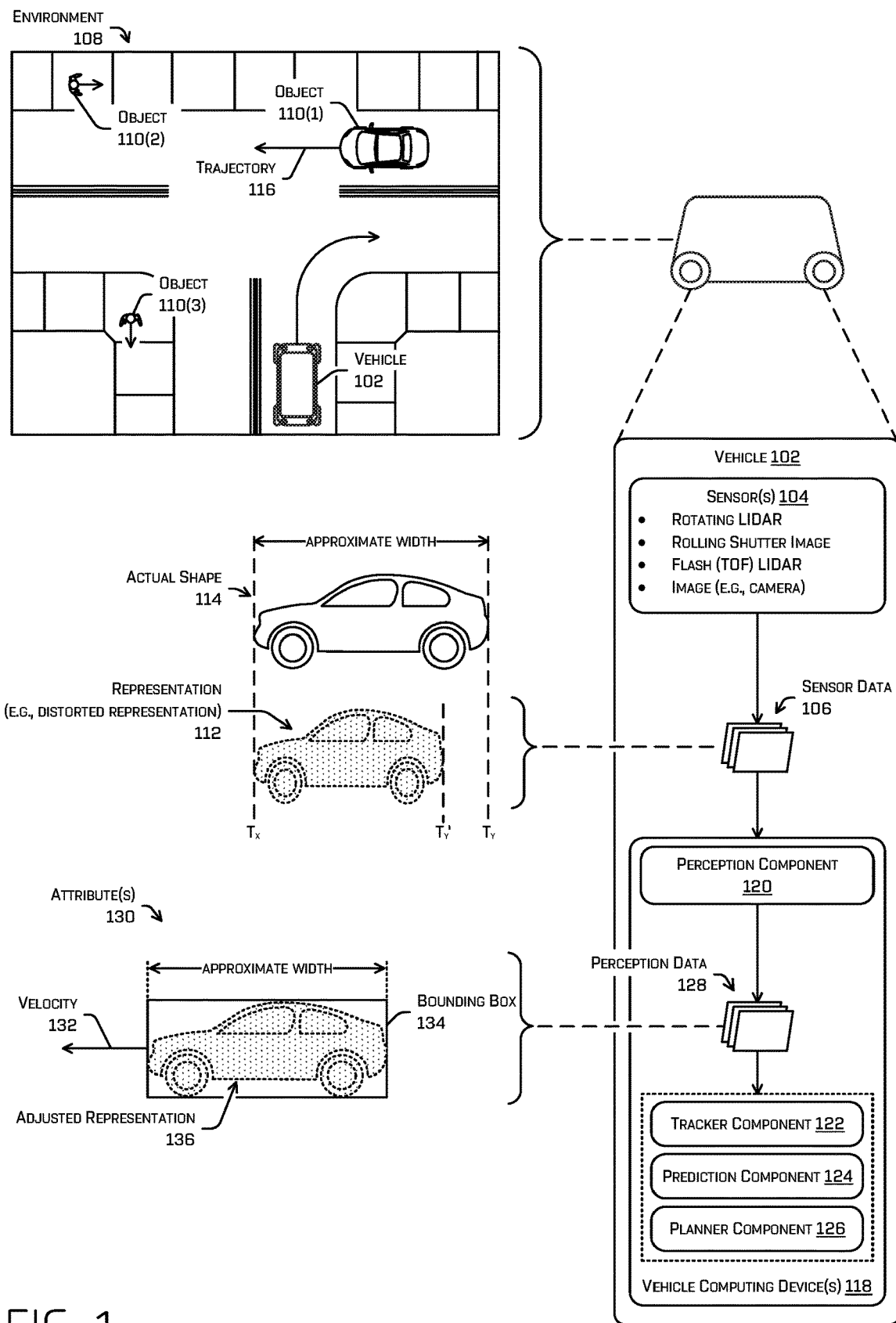
FIG. 1 is a pictorial flow diagram illustrating an example process according to the technologies described herein for determining object attributes based on distortions in temporal sensor data.

As noted above, instantaneous and temporal sensors can be used in various applications for data generation. However, temporal sensors can commonly experience latency-related issues in many of the scenarios in which they are utilized today. Take, for example, a temporal sensor (e.g., rotating lidar sensor, spinning radar sensor, rolling shutter image sensor, etc.) that generates temporal sensor data by scanning an area over a period of time. Such sensors may be used to image an area wherein data gathered over a period of time can be used to provide a more complete picture of the area by sweeping a sensor over an area, for example. Classical approaches may treat the output of such sensors as representing a single point in time because the sensor may sweep an area relatively quickly, for example. However, in some scenarios, such as if the temporal sensor is in motion (e.g., coupled to a rigid body that is in motion) or if an object in the environment is in motion, a representation of the object in the temporal sensor data may be distorted (e.g., elongated/stretched, compressed, skewed, etc.) relative to an actual shape of the object.

Although a distorted representation of an object in sensor data can seem undesirable, this application describes technologies that utilize distorted representations of objects to infer object attributes and other information associated with these objects, such as velocities, bounding boxes, object geometry, object location, object orientation, and the like. For example, the techniques described herein may be used to determine object attributes based at least in part on a magnitude and/or way in which a representation of an object in temporal sensor data is distorted. Additionally, the techniques described herein include utilizing object attributes determined based on distortions in sensor data to make track associations with tracked objects in an environment. Further, this disclosure describes techniques for using machine-learned models to determine object attributes based at least in part on temporal sensor data.

By way of example, and not limitation, a method according to the technologies described herein may include techniques of receiving sensor data including a representation of an object (e.g., vehicle, pedestrian, cyclist, animal, etc.) in an environment. In some examples, the sensor data may be generated by a temporal sensor that continuously, periodically, or otherwise scans the environment over a period of time. In some instances, the temporal sensor may be associated with a vehicle (e.g., coupled to the vehicle). As such, a trajectory or other movement of the object or the vehicle may contribute to a distortion in the representation of the object. For instance, because the object or the vehicle may be in motion during a scan of the temporal sensor, a shape of the representation of the object may appear distorted (e.g., elongated, compressed, skewed, etc.) relative to an actual shape of the object. In some examples, a magnitude of the distortion in the shape of the object may be proportional to a speed associated with the object and/or the vehicle.

In examples, the techniques described herein may be used with different temporal sensor modalities. For instance, the temporal sensor may include a rotating lidar sensor, a rolling shutter image sensor, a spinning radar sensor, or the like. In at least one example, when a rotating lidar sensor is used, a distortion in a representation of an object may be that the object appears elongated (stretched) or compressed (shrunk) relative to an actual shape of the object. In another example, if a rolling shutter image sensor is used, the distortion in the representation of the object may be that the object appears skewed (e.g., out of square) relative to the actual shape of the object.

In some examples, the techniques may include determining one or more attribute(s) associated with the object based at least in part on a difference between the representation of the object and another representation of the object in other sensor data generated by another sensor of the vehicle. In some examples, a velocity (e.g., lateral velocity) associated with the object may be a determined attribute. The determined velocity may, in some instances, be a component of a velocity vector associated with the object, and an orientation of the component may be perpendicular to a line of sight associated with the temporal sensor and/or the vehicle. As another example, a bounding box associated with the object may be a determined attribute. For example, if a bounding box were determined based on the sensor data alone, the bounding box may be an incorrect size due to the distortion of the object. However, by determining the bounding box based at least in part on the difference between the representation of the object and the other representation of the object, the bounding box may be more accurate with respect to representing an actual size of the object, position of the object, orientation of the object, etc.

In some examples, the other sensor of the vehicle may be an instantaneous sensor (e.g., flash lidar sensor, image sensor, etc.). As such, the other representation of the object in the other sensor data may correspond with an actual shape of the object. In other words, the trajectory or movement of the object or the vehicle may not contribute to another distortion in the other representation of the object in the other sensor data. In such an example, a width of the object may be directly inferred from the other sensor data.

In some examples, the other sensor of the vehicle may be another temporal sensor. As such, the trajectory or movement of the object or the vehicle may contribute to another distortion in the other representation of the object in the other sensor data. In some examples, the temporal sensor and the other temporal sensor may be the same or different sensor modalities. For instance, the temporal sensor and the other temporal sensor may both be rotating lidar sensors or rolling shutter image sensors, or the temporal sensor may be a rotating lidar sensor and the other temporal sensor may be a rolling shutter image sensor, in some cases. In some examples, the temporal sensor and the other temporal sensor may be scanning in different directions. For instance, the temporal sensor may be scanning in a first direction (e.g., clockwise, top-down, etc.) and the other temporal sensor may be scanning in a second direction (e.g., counter-clockwise, bottom-up, etc.). In some instances, the first direction and the second direction may be opposite scan directions (e.g., clockwise and counter-clockwise).

In some examples, because the two temporal sensors may be scanning in different directions, each of the temporal sensors may scan the object in a different amount of time. In some instances, the attribute(s) associated with the object may be determined based at least in part on these different amounts of time, as well as a difference between the two different amounts of time. As discussed herein, an instantaneous velocity can be determined using a temporal sensor depending on a sweeping direction of the scan path for the sensor. Through the use of multiple temporal sensors with different scan directions, instantaneous velocities in multiple directions can be determined.

In addition to, or in the alternative of, determining the attribute(s) associated with the object based at least in part on the difference between the representation of the object and the other representation of the object in the other sensor data, the attribute(s) may be determined by determining an estimated size of the object and then determining a difference between the estimated size of the object and a detected size of the representation of the object. That is, the attribute(s) may be determined in scenarios in which one temporal sensor is in use as opposed to multiple sensors or multiple temporal sensors. In some examples, the estimated size of the object may be closer to the actual size of the object than the detected size.

For example, the estimated size of the object may be determined based at least in part on a determination that the object corresponds with a tracked object. In some instances, the tracked object may be associated with the estimated size, and the estimated size of the tracked object may have been previously determined based at least in part on previously received sensor data. For instance, the estimated size of the tracked object may have been previously determined using the techniques described above and herein for utilizing distortions in temporal sensor data for determining object attributes.

As another example, in cases in which the object is another vehicle, the estimated size of the object may be determined by determining a vehicle model associated with the other vehicle and obtaining size information associated with the vehicle model. For instance, a classifier may classify an object as a particular make and model of vehicle, and size information and other data may be obtained from a database for that particular vehicle. In some examples, these techniques need not be done on vehicles, specifically, and classifications and estimated object sizes may be determined in this fashion for other objects as well (e.g., buildings, pedestrians, animals, light posts, etc.). However, in some examples, these techniques may be more successful with respect to vehicle-type objects because vehicle models and dimensions may be known (e.g., as opposed to the size of a human being). Nonetheless, similar techniques to these could be used on motorcycles, bicycles, or other objects where the size may be known or readily ascertainable.

In some examples, based on determining attribute(s) associated with an object according to the techniques described herein, a determination can be made as to whether an object corresponds with a tracked object. For example, a velocity associated with an object may be determined based at least in part on a distortion in temporal sensor data, and a determination can be made that the object corresponds with a tracked object based at least in part on the velocity being within a threshold velocity of a tracked velocity associated with the tracked object. In additional examples, determining that an object corresponds with a tracked object can be further based at least in part on other attributes as well, such as determining that a location of the object corresponds with or is nearby a tracked location, a size of the object corresponds with a tracked size, and/or the like.

In some examples, the techniques may include controlling operation of the vehicle based at least in part on determining attributes associated with an object or determining that an object corresponds with a tracked object. Additionally, in some examples, a predicted trajectory of an object can be determined based at least in part on determining attributes or track associations. In some instances, controlling operation of the vehicle may be based on the predicted trajectory.

In some examples, a machine-learned model may be trained to perform some of the various technologies described herein for determining object attributes based on temporal sensor data. In some examples, time-dimensional sensor data may be generated based on temporal sensor data. In some instances, the time-dimensional sensor data may be indicative of a movement of the object through space over a period of time. For instance, the time-dimensional sensor data may include a temporal dimension indicating respective points in time at which respective portions of the sensor data were captured by the temporal sensor. In at least one example, the sensor data is a three-dimensional (3D) lidar point cloud generated by a rotating lidar sensor and generating the time-dimensional sensor data comprises associating a respective timestamp with individual points of the lidar point cloud. In this way, the 3D lidar data may be converted to 4D lidar data, where the fourth dimension is a time dimension. In another example, the sensor data is image data (e.g., two-dimensional (2D) image data) generated by a rolling shutter image sensor and generating the time-dimensional sensor data comprises associating a respective timestamp with a pixel or line of pixels of the image data. In this way, the 2D image data may be converted to 3D image data, where the third dimension is a time dimension.

In some examples, the time-dimensional sensor data may be input into a machine-learned model and an output may be received from the machine-learned model. In examples, the output may include a predicted attribute associated with the object. The techniques may also include, in some instances, determining a difference between the predicted attribute and a measured attribute of the object. That is, the techniques may include determining whether the output of the machine-learned model is correct. In some instances, if the difference meets or exceeds a threshold difference, a parameter of the machine-learned model may be altered to minimize the difference and obtain a trained machine-learned model. The techniques may also include causing the machine-learned model to be sent to the vehicle to be used by the vehicle to traverse an environment.

According to the techniques described herein, several advantages in computer-related technology an autonomous driving may be realized. For instance, the disclosed techniques compliment many current techniques for calculating velocity. In general, radar dopplers give a velocity estimate in the component parallel to line of sight of the vehicle, whereas the disclosed techniques give an estimate for the velocity component perpendicular to line of sight. In some examples, a yaw estimate for an object can be determined in order to aid determination of instantaneous velocity components of the object and/or to align the instantaneous velocity reading with a global velocity of the object (e.g., transforming a detected perpendicular or parallel instantaneous velocity component to a direction that the object may be facing compared to the sensor(s) using a yaw estimate). Additionally, the disclosed techniques for velocity inference are different and lower level than using temporally consecutive detections to derive velocity. The disclosed techniques provide essentially an instantaneous velocity estimate rather than requiring detections at multiple time intervals. The techniques are also not sensitive to the tracking of an object in which noise in the detections can lead to false velocity inference. Further, the techniques can also improve segmentation by detecting which portions of the sensor data are moving together and which portions are remaining stationary.

Additionally, the techniques described herein improve the safe operation of autonomous vehicles. For instance, lateral velocity components of objects can be determined almost instantaneously, allowing for a quicker determination of a trajectory of an object. This in turn allows faster planning and vehicle decision making to avoid collisions and other adverse events. Further, the techniques allow for determining more precise locations of objects in the environment, helping the vehicle to avoid coming in too close of proximity to the objects and/or helping avoid collisions.

The techniques described herein can be implemented in a number of ways. Example implementations are provided below with reference to the following figures. Example implementations are discussed in the context of autonomous vehicles: however, the methods, apparatuses, and components described herein can be applied to a variety of components (e.g., a sensor component or a robotic platform), and are not limited to autonomous vehicles. For example, the techniques can be utilized in semi-autonomous vehicles, driver assistance systems for manually driven vehicles, aviation or nautical contexts, manufacturing contexts, or in other contexts employing temporal sensor systems. Furthermore, the techniques described herein can be used with real data (e.g., captured using sensor(s)), simulated data (e.g., generated by a simulator), or any combination of the two.

In some examples, a sweep speed and/or resolution of a temporal sensor can be adjusted based on environmental or expected object parameters for a given environment. For example, if a vehicle using temporal sensors traverses from a highway to an offramp and onto a city street, the relative speeds expected between the vehicle and external objects may be expected to change and/or the distance between the vehicle and objects may be expected to change. If so, the resolution and/or sweeping speeds of temporal sensors may be adjusted to better enable detecting instantaneous velocity of objects or account for temporal sensor distortions in the environment.

FIG. 1 is a pictorial flow diagram illustrating an example process 100 according to the technologies described herein for determining object attributes based on distortions in temporal sensor data. In examples, the vehicle 102 may include one or more sensor(s) 104, and the sensor(s) 104 may capture sensor data 106 associated with an environment 108 surrounding the vehicle 102. The environment 108 may include one or more objects, such as the object 110(1), which represents another vehicle, and the objects 110(2) and 110(3), which represent pedestrians, and/or other objects (e.g., cyclists, animals, vegetation, buildings, streetlights, etc.). In at least one example, the sensor(s) 104 may include temporal sensors as well as instantaneous sensors. For instance, the sensor(s) 104 may include lidar sensors (e.g., rotating lidar sensors, flash (or time-of-flight) lidar sensors), image sensors, rolling shutter image sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor(s) 104 may generate the sensor data 106 associated with the environment 108, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In some examples, the sensor data 106 may be temporal sensor data, such as lidar data generated by a rotating lidar sensor or image data generated by a rolling shutter camera. In such examples, because a temporal may continuously scan the environment 108 over a period of time, movement of objects 110 and/or movement of the vehicle 102 may contribute to representations of the objects 110 being distorted. For example, the sensor data 106 includes a representation 112 of the object 110(1) that is distorted (e.g., horizontally compressed) relative to an actual shape 114 of the object 110(1). In the example of FIG. 1, the representation 112 of the object 110(1) is horizontally compressed because the trajectory 116 of the object 110(1) is from right-to-left (relative to the vehicle 102) and the sensor that generated the sensor data 106 is scanning from left-to-right (e.g., from $T_X$ to $T_Y$). Because the representation 112 of the object 110(1) is horizontally compressed, a width of the representation 112 is less than an approximate width of the actual shape 114 of the object 110(1). In examples, if the sensor of the vehicle 102 that generated the sensor data 106 were scanning from right-to-left, the representation of the object 110(1) would be horizontally elongated such that the width of the representation would be greater than the approximate width.

In some examples, the vehicle 102 may include one or more vehicle computing device(s) 118. The vehicle computing device(s) 118 may include computing resources to execute one or more components (e.g., software or hardware components), such as a perception component 120, a tracker component 122, a prediction component 124, and a planner component 126. Additional details about these components are discussed in greater detail below with regard to FIG. 14.

In examples, the sensor data 106 may be sent to the perception component 120 of the vehicle 102. The perception component 120 of the vehicle 102 may generate or otherwise determine perception data 128 based at least in part on the sensor data 106. In some examples, the perception data 128 may include one or more attribute(s) 130 associated with the object 110(1) that are determined by the perception component 120, such as a velocity 132 of the object 110(1), a bounding box 134 associated with the object 110(1), an adjusted representation 136 of the object 110(1), a location of the object 110(1), an orientation of the object 110(1), and the like. In some examples, the bounding box 134 may be indicative of one or more attributes associated with the object 110(1), such as the location, the orientation, a size of the object 110(1), and the like.

In some examples, the perception component 120 may determine the attribute(s) 130 based on a difference between the representation 112 of the object 110(1) and the actual shape 114 of the object 110(1). Additionally, or alternatively, the perception component 120 may determine the attribute(s) 130 based on a difference between the representation 112 of the object 110(1) and another representation of the object in other sensor data generated by another sensor of the vehicle 102 (e.g., another sensor that is scanning in a different direction than the sensor that generated the sensor data 106).

In some examples, given the representation 112 of the object 110(1) and the actual shape 114 of the object 110(1), the perception component 120 may determine the velocity 132 of the object 110(1) by determining a difference in angular width of the representation 112 minus the width of the actual shape 114, and then dividing the difference by the amount of time the temporal sensor spent scanning the whole object (e.g., from $T_X$ to $T_Y'$). In some examples, a top-to-bottom or bottom-to-top scanning sensor (e.g., a rolling shutter camera) may have a sheering (skew) effect, so to determine the width of the object the largest width of the other sensor data across all rows (e.g., pixel rows) may be used. The velocity equation for such examples can be derived as:

$$\text{velocity} = \frac{(A_1 - A_0) - \text{width}}{T_Y' - T_X}$$

In the above equation, "$T_X$" is the time at which the temporal sensor started scanning the object 110(1), "$T_Y$" is the time at which the temporal sensor finished scanning the object 110(1), "$A_0$" is the angle of the near side (start of scan) of the object 110(1) relative to the temporal sensor at time $T_X$ (e.g., 90 degrees), "$A_1$" is the angle of the far side (end of scan) of the object 110(1) relative to the temporal sensor at time $T_Y'$ (e.g., 92.5 degrees), and "width" is the approximate width of the actual shape 114 of the object 110(1) in the dimension perpendicular to the line of sight of the temporal sensor. In examples, the velocity 132 may be a lateral velocity of the object 110(1). That is, the velocity 132 may be a component of a velocity vector where the component is perpendicular to a line of sight of the sensor and parallel to a sweeping direction of the sensor. In some examples, the perception component 120 may determine a magnitude of the velocity vector associated with the object 110(1) based on a value of the component of the velocity vector and an orientation (e.g., yaw) of the object 110(1). In the preceding and following equations, an angular to actual/estimated transformation may be performed. For example, the width in the preceding equation may be an angular width of the object. The angles ($A_1$ and $A_0$), for example, may be transformed into an actual/estimated width between respective pixels/features using, for example, a distance estimate to the object.

In some examples, the perception data 128 may be forwarded to one or more of the tracker component 122, the prediction component 124, and/or the planner component 126. In some examples, the tracker component 122 may track locations, trajectories, attributes, and the like associated with objects 110 in the environment 108. In some examples, the tracker component 122 may utilize the attribute(s) 130 in the perception data 128 to determine a track association associated with the object 110(1). That is, the tracker component 122 may be tracking the object 110(1) as a tracked object and, based at least in part on the attribute(s) 130, determine that the object 110(1) corresponds with the tracked object. For example, the tracker component 122 may determine a track association based on a determination that the velocity 132 of the object 110(1) is similar to (e.g., within a threshold value) of a tracked velocity of the tracked object. As another example, the tracker component 122 may determine a track association based on a determination that the bounding box 134 associated with the object 110(1) is similar in size, shape, extent, location, orientation, etc, with respect to a tracked bounding box associated with the tracked object.

In some examples, the prediction component 124 may determine predicted trajectories of the objects 110 in the environment 108. In examples, the prediction component 124 may utilize object attribute(s) to determine the predicted trajectories of the objects 110. For example, the prediction component 124 may determine a predicted trajectory of the object 110(1) based at least in part on the attribute(s) 130 included in the perception data 128, such as the velocity 132, the bounding box 134, and/or other attribute(s) 130. In at least one example, the prediction component 124 may receive object tracking information (e.g., track associations) from the tracker component 122 and determine predicted trajectories for objects based at least in part on the object tracking information.

Figure 2:
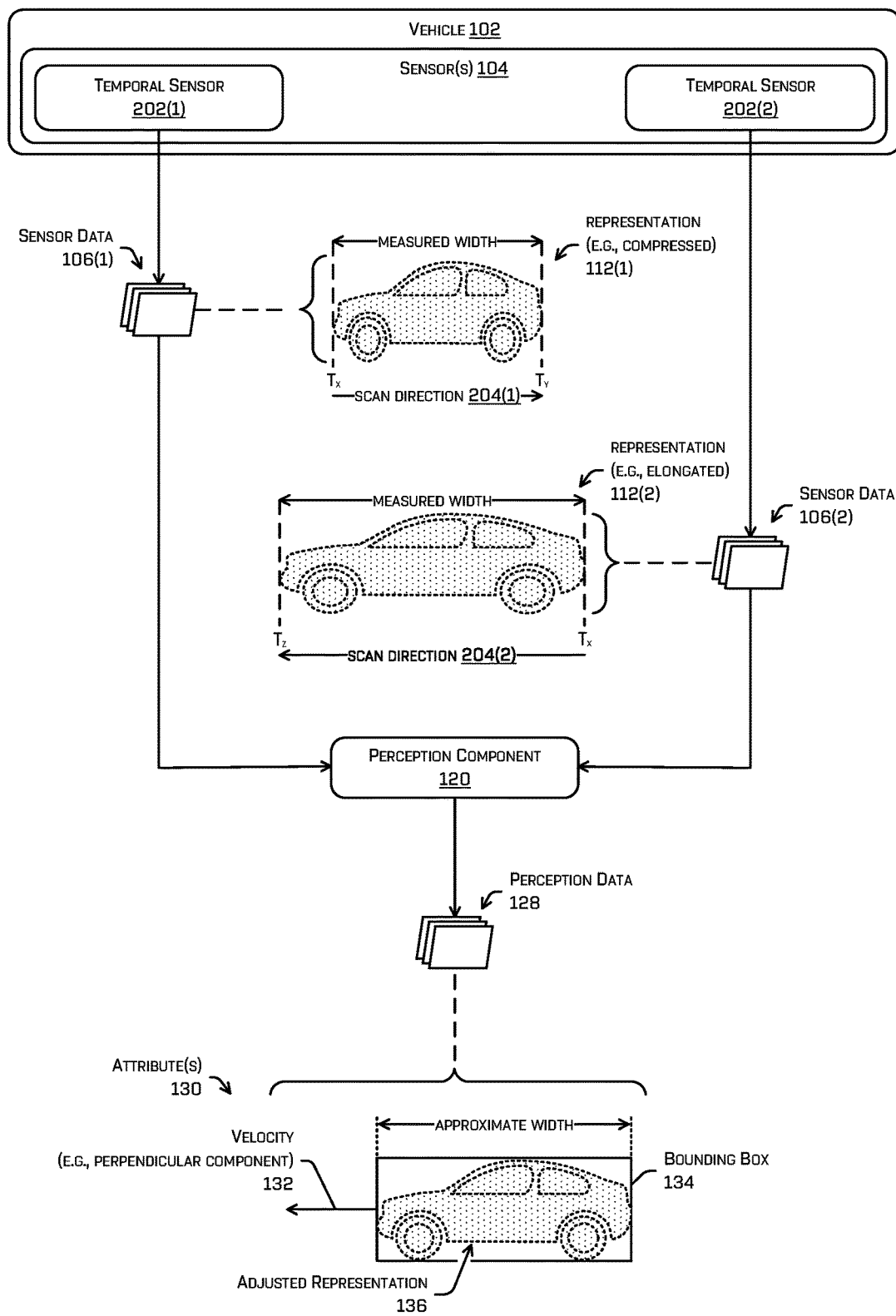
FIG. 2 is a pictorial flow diagram illustrating an example process associated with determining object attributes based on sensor data generated by two temporal sensors scanning in opposite directions.

In some examples, the planner component 126 may determine planned trajectories for the vehicle 102 to follow in the environment 108. In examples, the planner component 126 may utilize object attribute(s) to determine the planned trajectories for the vehicle 102 to follow: For example, the planner component 126 may determine a planned trajectory for the vehicle 102 to follow based at least in part on the attribute(s) 130 included in the perception data 128, such as the velocity 132, the bounding box 134, and/or other attribute(s) 130. Additionally, or alternatively, in at least one example, the planner component 126 may receive object tracking information (e.g., track associations) from the tracker component 122 and/or prediction information (e.g., predicted trajectories) from the prediction component 124 and utilize that information to determine a planned trajectory for the vehicle 102 to follow;

FIG. 2 is a pictorial flow diagram illustrating an example process 200 associated with determining object attribute based on sensor data generated by two temporal sensors scanning in opposite directions. For instance, the sensor(s) 104 of the vehicle 102 may include a first temporal sensor 202(1) and a second temporal sensor 202(2). The first temporal sensor 202(1) may be scanning in a first scan direction 204(1) and the second temporal sensor 202(2) may be scanning in a second scan direction 204(2) that is opposite of the first scan direction 204(1). For instance, the first temporal sensor 202(1) may be a first rotating lidar sensor that is scanning (e.g., spinning) in a clockwise (left-to-right) scan direction 204(1) and the second temporal sensor 202(2) may be a second rotating lidar sensor that is scanning in a counter-clockwise (right-to-left) scan direction 204(2). In such a configuration, averaging the distortion between the two sensors scanning in opposite directions can give the actual/approximate width of the object.

The first temporal sensor 202(1) may generate first sensor data 106(1) that includes a first representation 112(1) of an object (e.g., the object 110(1) of FIG. 1). The first representation 112(1) of the object shown in FIG. 2 is distorted such that the shape of the object is compressed relative to a real shape of the object (e.g., the measured width is less than the approximate width). In some examples, the compressed shape of the first representation 112(1) of the object may be due to movement of the object or the vehicle 102. For instance, if the object is moving from right-to-left with respect to the line of sight of the first temporal sensor 202(1), the first temporal sensor 202(1) will have a tendency to scan the object faster because the first scan direction 204(1) of the first temporal sensor 202(1) is opposite the direction of travel of the object. Additionally, movement of the vehicle 102 itself can contribute to the distortion.

The second temporal sensor 202(2) may generate second sensor data 106(2) that includes a second representation 112(2) of the object. The second representation 112(2) of the object is distorted such that the shape of the object is elongated relative to the real shape of the object (e.g., the measured width is greater than the approximate width). In some examples, the elongated shape of the second representation 112(2) of the object may be due to movement of the object or the vehicle 102. For instance, if the object is moving from right-to-left with respect to the line of sight of the second temporal sensor 202(2), the second temporal sensor 202(2) will have a tendency to take a longer period of time to scan the object because the second scan direction 204(2) of the second temporal sensor 202(2) is the same as the direction of travel of the object. For example, the period of time between $T_X$ and $T_Y$ associated with the first temporal sensor 202(1) scanning the object is less than (e.g., shorter in duration) than the period of time between $T_X$ and $T_Z$ associated with the second temporal sensor 202(2) scanning the object, where $T_X$ in the first representation 112(1) and the second representation 112(2) are a same point in time.

In some examples, the first sensor data 106(1) and the second sensor data 106(2) may be sent to the perception component 120. The perception component 120 may generate or otherwise determine the perception data 128 based at least in part on the first sensor data 106(1) and the second sensor data 106(2). In some examples, the perception data 128 may include the one or more attribute(s) 130 associated with the object that are determined by the perception component 120, such as the velocity 132 of the object, the bounding box 134 associated with the object, the adjusted representation 136 of the object, a location of the object, an orientation of the object, and/or the like. In some examples, the bounding box 134 itself may be indicative of one or more of the attributes associated with the object, such as the location, the orientation, the size of the object, and the like.

In some examples, the perception component 120 may determine the attribute(s) 130 based on a difference between the first representation 112(1) of the object and the second representation 112(2) of the object. For instance, in some examples the perception component 120 may average the sizes of the first representation 112(1) and the second representation 112(2) to determine the approximate width, the bounding box 134, and/or the adjusted representation.

In the example of FIG. 2 where there are two temporal sensors scanning in opposite directions, to determine the velocity 132 of the object, the perception component 120 may need to determine respective sensor angles at which the first temporal sensor 202(1) and the second temporal sensor 202(2) started and finished scanning the object. Additionally, the perception component 120 may need to determine the respective times at which the temporal sensors 202(1) and 202(2) started and finished scanning the object to determine the velocity 132. Additionally, in some instances, the perception component 120 may need to determine a distance between the object and the vehicle 102 and/or the temporal sensors 202(1) and 202(2) to determine the velocity 132. With this information, the perception component 120 may determine the velocity 132 of the object using the following two equations in which the variable for "velocity" and "width" are unknown:

$$\text{velocity} = \frac{(AR_1 - AL_1) - \text{width}}{T_Y - T_X} \quad (1)$$

$$\text{velocity} = \frac{(AL_2 - AR_2) - \text{width}}{T_Z - T_X} \quad (2)$$

In the above equations (where equation (1) corresponds with the first temporal sensor 202(1) and equation (2) corresponds with the second temporal sensor 202(2)), "$T_X$" is the time at which the temporal sensors 202(1) and 202(2) started scanning the object, "$T_Y$" is the time at which the first temporal sensor 202(1) finished scanning the object, "$T_Z$" is the time at which the second temporal sensor 202(2) finished scanning the object, "$AR_1$" is the angle of the right side of the object relative to the first temporal sensor 202(1), "$AL_1$" is the angle of the left side of the object relative to the first temporal sensor 202(1), "$AR_2$" is the angle of the right side of the object relative to the second temporal sensor 202(2), "$AL_2$" is the angle of the left side of the object relative to the second temporal sensor 202(2), and "velocity" and "width" are the unknown variables. These two equations may be used to solve for the velocity 132 and the approximate width of the object in the perception data 128. In some examples, the width and respective scanning times can be the width and scanning time for a whole object, or a portion of the object. In some examples, the "width" in the equation above may not be a true, lateral width of the object, but rather an angular width. In such a case, to determine the lateral width of the object from the perspective of the vehicle, a distance between the object and the vehicle may need to be taken into account.

Figure 3:
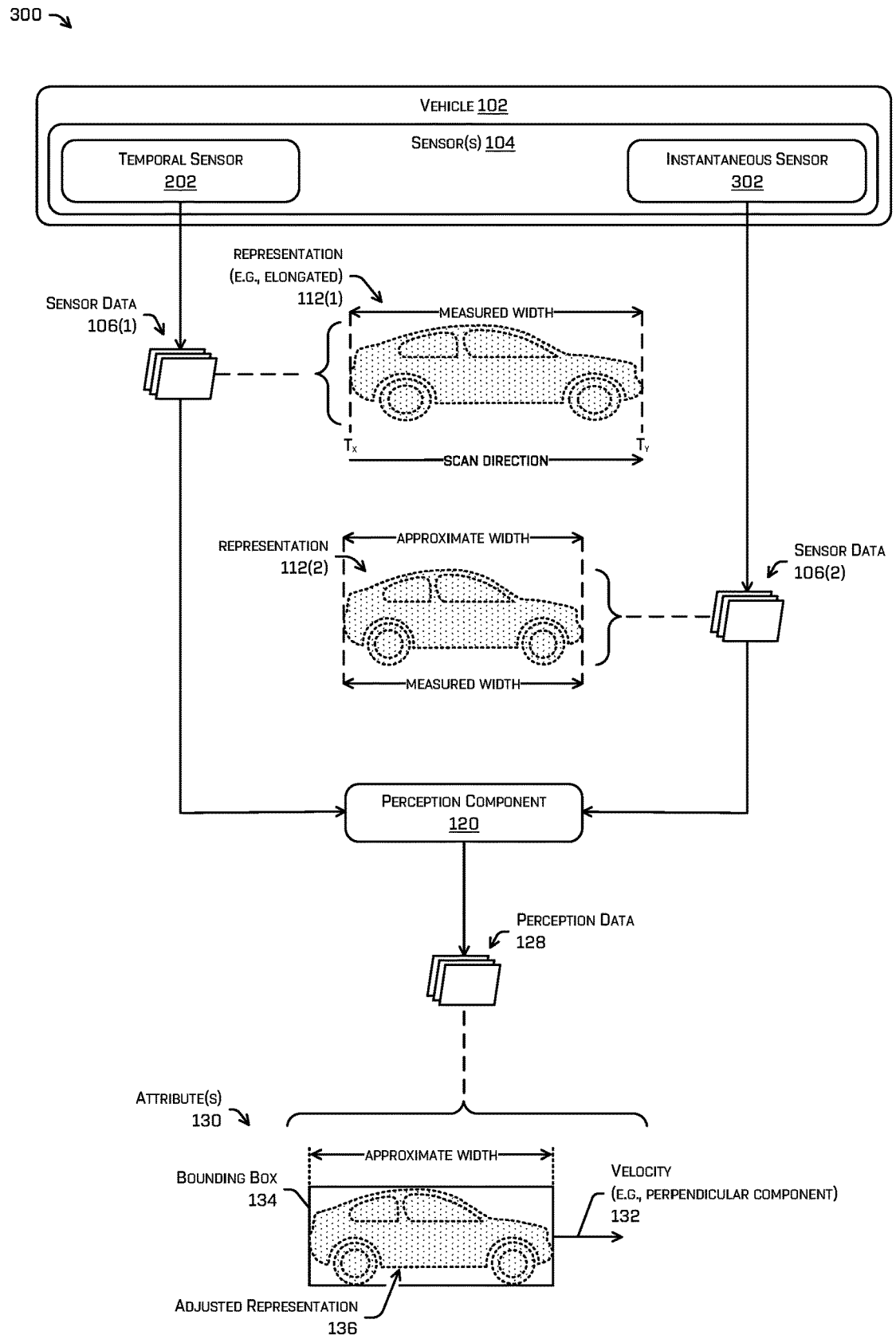
FIG. 3 is a pictorial flow diagram illustrating an example process associated with determining object attributes based on sensor data generated by a temporal sensor and an instantaneous sensor.

FIG. 3 is a pictorial flow diagram illustrating an example process 300 associated with determining object attributes based on sensor data generated by a temporal sensor and an instantaneous sensor. For instance, the sensor(s) 104 of the vehicle 102 may include a temporal sensor 202 and an instantaneous sensor 302. In some examples, the temporal sensor 202 may be a rotating lidar sensor that is scanning (e.g., spinning) in a clockwise (left-to-right) scan direction and the instantaneous sensor 302 may be a flash lidar sensor, an image sensor (e.g., camera), or another type of instantaneous sensor.

The temporal sensor 202 may generate first sensor data 106(1) that includes a first representation 112(1) of an object (e.g., the object 110(1) of FIG. 1). The first representation 112(1) of the object shown in FIG. 3 is distorted such that the shape of the object is horizontally elongated relative to a real shape of the object (e.g., the measured width is less than the approximate width). In some examples, the elongated shape of the first representation 112(1) of the object may be due to movement of the object or the vehicle 102. For instance, if the object is moving from left-to-right with respect to the line of sight of the first temporal sensor 202(1), the temporal sensor 202 will have a tendency to take longer to scan the object because the scan direction of the temporal sensor 202 is the same as the direction of travel of the object. Additionally, movement of the vehicle 102 itself can contribute to the distortion.

The instantaneous sensor 302 may generate second sensor data 106(2) that includes a second representation 112(2) of the object. Unlike the first representation 112(1) of the object, the second representation 112(2) of the object is not distorted or is at least similar in shape to an actual shape of the object, which may be dependent on a speed or latency associated with the instantaneous sensor 302. As such, the measured width of the second representation 112(2) of the object may be the same as or similar to the approximate width of the object.

In some examples, the first sensor data 106(1) and the second sensor data 106(2) may be sent to the perception component 120. The perception component 120 may generate or otherwise determine the perception data 128 based at least in part on the first sensor data 106(1) and the second sensor data 106(2). In some examples, the perception data 128 may include the one or more attribute(s) 130 associated with the object that are determined by the perception component 120, such as the velocity 132 of the object, the bounding box 134 associated with the object, the adjusted representation 136 of the object, a location of the object, an orientation of the object, and/or the like. In some examples, the bounding box 134 itself may be indicative of one or more of the attributes associated with the object, such as the location, the orientation, the size of the object, and the like.

In some examples, the perception component 120 may determine the attribute(s) 130 based on a difference between the first representation 112(1) of the object and the second representation 112(2) of the object. In some examples, the perception component 120 may determine some attribute(s) 130 based on the instantaneous sensor data, and determine other attribute(s) 130 based on a combination of the instantaneous sensor data and the temporal sensor data, or even the temporal sensor data itself. For example, the perception component 120 may determine the approximate width of the object and/or the bounding box 134 based on the instantaneous sensor data, while determining the velocity 132 of the object based on both the temporal sensor data and the instantaneous sensor data.

In the example of FIG. 3 where the vehicle 102 includes an instantaneous sensor 302 that can generate sensor data 106(2) that includes very minimal distortions, to determine the velocity 132 of the object, the perception component 120 may determine the velocity 132 of the object by determining a difference in angular width of the first representation 112(1) minus the width of the representation 112(2), and then dividing the difference by the amount of time the temporal sensor 202 spent scanning the whole object (e.g., from $T_X$ to $T_Y$). The velocity equation for such examples can be derived as:

$$\text{velocity} = \frac{(A_1 - A_0) - \text{width}}{T_Y - T_X}$$

In the above equation, "$T_X$" is the time at which the temporal sensor 202 started scanning the object, "$T_Y$" is the time at which the temporal sensor 202 finished scanning the object, "$A_0$" is the angle of the near side (start of scan) of the object relative to a line of sight of the temporal sensor 202 at time $T_X$, "$A_1$" is the angle of the far side (end of scan) of the object relative to the line of sight of the temporal sensor 202 at time $T_Y$ (e.g., 92.5 degrees), and "width" is the approximate width of the representation 112(2) of the object included in the sensor data 106(2) generated by the instantaneous sensor 302. In examples, the velocity 132 may be a lateral velocity of the object. That is, the velocity 132 may be a component of a velocity vector where the component is perpendicular to a line of sight of the sensor. In some examples, the width and respective scanning times can be the width and scanning time for a whole object, or a portion of the object (e.g., a wheel of a vehicle). In some examples, the "width" in the equation above may not be a true, lateral width of the object, but rather an angular width. In such a case, to determine the lateral width of the object from the perspective of the vehicle, a distance between the object and the vehicle may need to be taken into account.

Figure 4:
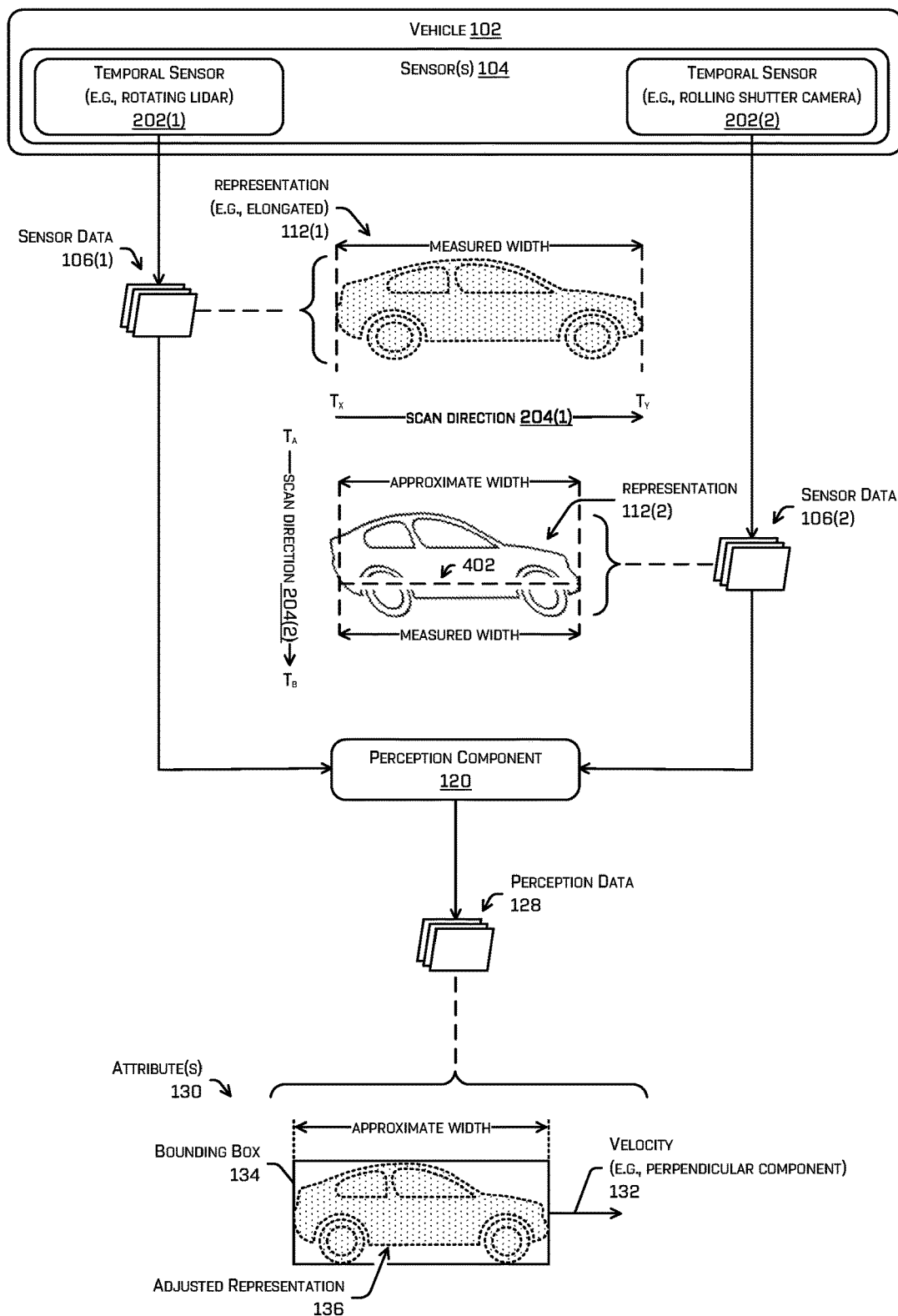
FIG. 4 is a pictorial flow diagram illustrating an example process associated with determining object attributes based on sensor data generated by a first temporal sensor scanning in a first direction and a second temporal sensor scanning in a second direction.

FIG. 4 is a pictorial flow diagram illustrating an example process 400 associated with determining object attributes based on sensor data generated by a first temporal sensor scanning in a first direction and a second temporal sensor scanning in a second direction. For instance, the sensor(s) 104 of the vehicle 102 may include the first temporal sensor 202(1) and the second temporal sensor 202(2). In some examples, the first temporal sensor 202(1) and the second temporal sensor 202(2) may be different sensor modalities. For instance, the first temporal sensor 202(1) may be a rotating lidar sensor and the second temporal sensor 202(2) may be a rolling shutter camera. In the example shown in FIG. 4, the first temporal sensor 202(1) is scanning in a first scan direction 204(1) (e.g., left-to-right or clockwise) and the second temporal sensor 202(2) is scanning in a second scan direction 204(2) (e.g., top-to-bottom) that is different than the first scan direction 204(1).

The first temporal sensor 202(1) may generate first sensor data 106(1) that includes a first representation 112(1) of an object (e.g., the object 110(1) of FIG. 1). The first representation 112(1) of the object shown in FIG. 4 is distorted such that the shape of the object is elongated relative to the real shape of the object (e.g., the measured width is greater than the approximate width). In some examples, the elongated shape of the first representation 112(1) of the object may be due to movement of the object or the vehicle 102. For instance, if the object is moving from left-to-right with respect to the line of sight of the first temporal sensor 202(1), the first temporal sensor 202(1) will have a tendency to take a longer period of time to scan the object because the first scan direction 204(1) of the first temporal sensor 202(1) is the same as the direction of travel of the object.

The second temporal sensor 202(2) may generate second sensor data 106(2) that includes a second representation 112(2) of the object. The second representation 112(2) of the object is distorted such that the shape of the object is skewed or sheered relative to the real shape of the object. However, in such examples, a measured width of the object across a row 402 of data (e.g., pixels, lidar data, etc.) may be the same as or similar to the approximate width of the object. In some examples, the skewed/sheered shape of the second representation 112(2) of the object may be due to movement of the object or the vehicle 102. For instance, because the object is moving from left-to-right while the second temporal sensor 202(2) is scanning the object from top-to-bottom in the second scan direction 204(2), the second representation 112(2) may be skewed as the object moves through space over a period of time from $T_A$ to $T_B$. In some examples, the period of time between $T_X$ and $T_Y$ associated with the first temporal sensor 202(1) scanning the object may be greater than, the same as, or less than the period of time between $T_A$ and $T_B$ associated with the second temporal sensor 202(2) scanning the object. In some examples. $T_X$ and $T_A$ may be a same point in time or different points in time. Additionally, in some instances $T_Y$ and $T_B$ may be a same point in time or different points in time. Further, in some examples, $T_X$ and $T_B$ could be a same point in time, or $T_Y$ and $T_A$ could be a same point in time.

In some examples, the first sensor data 106(1) and the second sensor data 106(2) may be sent to the perception component 120. The perception component 120 may generate or otherwise determine the perception data 128 based at least in part on the first sensor data 106(1) and the second sensor data 106(2). In some examples, the perception data 128 may include the one or more attribute(s) 130 associated with the object that are determined by the perception component 120, such as the velocity 132 of the object, the bounding box 134 associated with the object, the adjusted representation 136 of the object, a location of the object, an orientation of the object, and/or the like. In some examples, the bounding box 134 itself may be indicative of one or more of the attributes associated with the object, such as the location, the orientation, the size of the object, and the like.

In some examples, the perception component 120 may determine the attribute(s) 130 based on a difference between the first representation 112(1) of the object and the second representation 112(2) of the object. For instance, in some examples the perception component 120 may average the sizes of the first representation 112(1) and the second representation 112(2) to determine the approximate width, the bounding box 134, and/or the adjusted representation. In some examples, the perception component 120 may determine a width of the bounding box 134 based on the measured width of the object in a single row 402 of sensor data. Additionally, in some examples, the perception component 120 may relax (e.g., skew) the second representation 112(2) to counter the induced skew to determine the adjusted representation 136 of the object.

In the example of FIG. 4 where the vehicle 102 includes the second temporal sensor 202(2) scanning in the second scan direction 204(2) such that the measured width of the object across the row 402 of sensor data is similar to or the same as the approximate width of the object, the perception component 120 may determine the velocity 132 of the object by determining a difference in angular width of the first representation 112(1) minus the measured width of the representation 112(2), and then dividing the difference by the amount of time the first temporal sensor 202(1) spent scanning the whole object (e.g., from $T_X$ to $T_Y$). The velocity equation for such examples can be derived as:

$$\text{velocity} = \frac{(A_1 - A_0) - \text{width}}{T_Y - T_X}$$

In the above equation, "$T_X$" is the time at which the first temporal sensor 202(1) started scanning the object, "$T_Y$" is the time at which the first temporal sensor 202(1) finished scanning the object, "$A_0$" is the angle of the near side (start of scan) of the object relative to a line of sight of the first temporal sensor 202(1) at time $T_X$, "$A_1$" is the angle of the far side (end of scan) of the object relative to the line of sight of the first temporal sensor 202(1) at the time $T_Y$, and "width" is the measured width of the representation 112(2) of the object across the row 402 of the sensor data 106(2). In examples, the velocity 132 may be a lateral velocity of the object. That is, the velocity 132 may be a component of a velocity vector where the component is perpendicular to a line of sight of the sensor.

Figure 5:
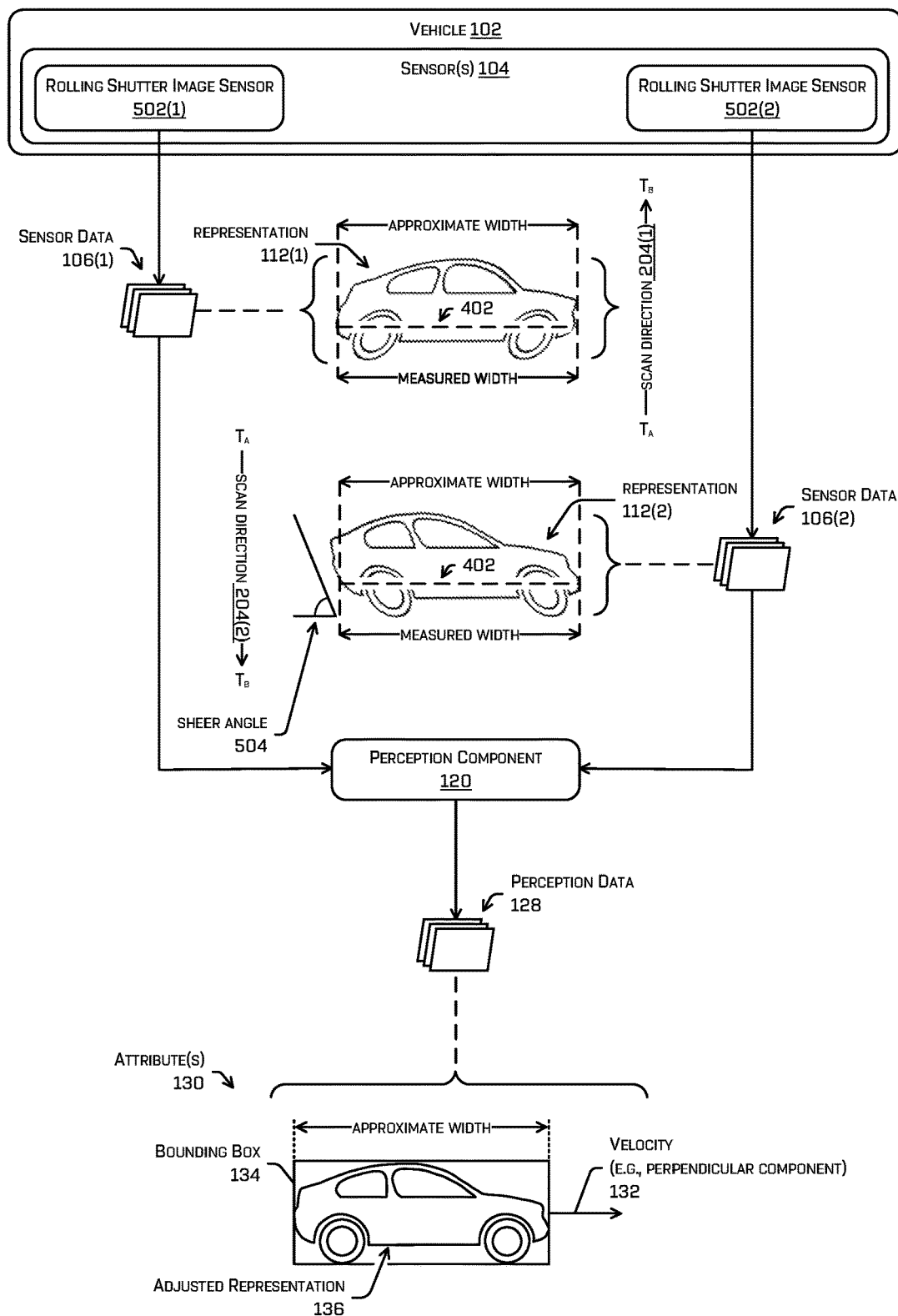
FIG. 5 is a pictorial flow diagram illustrating an example process associated with determining object attributes based on sensor data generated by two rolling shutter image sensors.

FIG. 5 is a pictorial flow diagram illustrating an example process 500 associated with determining object attributes based on sensor data generated by two rolling shutter image sensors. For instance, the sensor(s) 104 of the vehicle 102 may include a first rolling shutter image sensor 502(1) and a second rolling shutter image sensor 502(2). In the example shown in FIG. 5, the first rolling shutter image sensor 502(1) is scanning in a first scan direction 204(1) (e.g., upward) and the second rolling shutter image sensor 502(2) is scanning in a second scan direction 204(2) (e.g., downward) that is opposite the first scan direction 204(1).

The first rolling shutter image sensor 502(1) may generate first sensor data 106(1) (e.g., image data) that includes a first representation 112(1) of an object. The first representation 112(1) of the object shown in FIG. 5 is distorted such that the shape of the object is skewed/sheered (e.g., skewed/sheered diagonally from bottom-left to top-right) relative to the real shape of the object. In some examples, the skewed shape of the first representation 112(1) of the object may be due to movement of the object or the vehicle 102. For instance, if the object is moving from left-to-right during a period of time (between $T_A$ and $T_B$) in which the first rolling shutter image sensor 502(1) is scanning the object, the first representation 112(1) of the object can become skewed. In other words, as time progresses from $T_A$ to $T_B$ throughout the scan in the upward scan direction, the object moves through space from left-to-right, causing sensor data corresponding with a bottom portion of the object to be captured at an earlier point in time than sensor data corresponding to a top portion of the object.

The second rolling shutter image sensor 502(2) may generate second sensor data 106(2) (e.g., image data) that includes a second representation 112(2) of the object. The second representation 112(2) of the object is distorted such that the shape of the object is skewed/sheered (e.g., skewed/sheered diagonally from top-left to bottom-right) relative to the real shape of the object. In some examples, the skewed shape of the second representation 112(2) of the object may be due to movement of the object or the vehicle 102. For instance, if the object is moving from left-to-right during a period of time (between $T_A$ and $T_B$) in which the second rolling shutter image sensor 502(2) is scanning the object, the second representation 112(2) of the object can become skewed. That is, as time progresses from $T_A$ to $T_B$ throughout the scan in the downward scan direction, the object moves through space from left-to-right, causing sensor data corresponding with the top portion of the object to be captured at an earlier point in time than sensor data corresponding to the bottom portion of the object. Although the skew/sheering examples, discussed in FIG. 5 are with respect to rolling shutter image sensors, it is to be understood that skewing/sheering can affect any other types of temporal sensor modalities as well that are scanning in a direction that is perpendicular to a direction of travel of an object. For instance, rotating lidar sensors may be oriented to scan in an upward or downward direction, and if objects being scanned are moving in a direction perpendicular to the scan direction, the lidar data representations may experience skew/sheer as well.

In some examples, the first sensor data 106(1) and the second sensor data 106(2) may be sent to the perception component 120. The perception component 120 may generate or otherwise determine the perception data 128 based at least in part on the first sensor data 106(1) and the second sensor data 106(2). In some examples, the perception data 128 may include the one or more attribute(s) 130 associated with the object that are determined by the perception component 120, such as the velocity 132 of the object, the bounding box 134 associated with the object, the adjusted representation 136 of the object, a location of the object, an orientation of the object, and/or the like. In some examples, the bounding box 134 itself may be indicative of one or more of the attributes associated with the object, such as the location, the orientation, the size of the object, and the like.

In some examples, the perception component 120 may determine the attribute(s) 130 based on a difference between the first representation 112(1) of the object and the second representation 112(2) of the object. For instance, in some examples the perception component 120 may average the shapes of the first representation 112(1) and the second representation 112(2) to determine the adjusted representation. In some examples, the perception component 120 may determine a width of the bounding box 134 based on the measured width of the object in a single row 402 of sensor data (e.g., row of pixel).

In the example of FIG. 5 where the vehicle 102 includes the first rolling shutter image sensor 502(1) and the second rolling shutter image sensor 502(2), the perception component 120 may determine the velocity 132 of the object based at least in part on an estimated sheer angle 504 associated with the skew/sheer of a representation of the object. For instance, a value/magnitude of the sheer angle 504 may be proportional to, or otherwise indicative of, the velocity 132 of the object.

Figure 6:
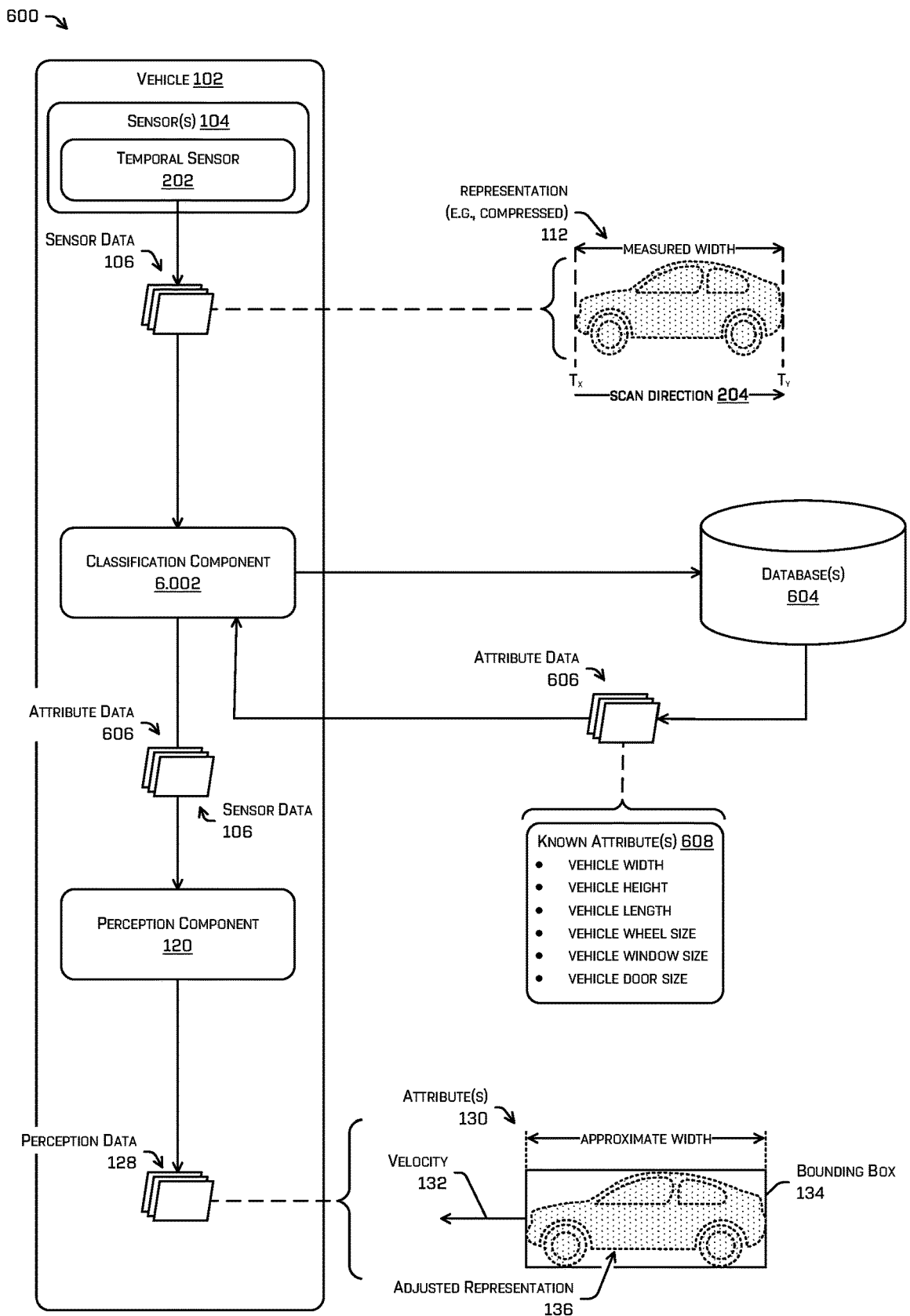
FIG. 6 is a pictorial flow diagram illustrating an example process associated with determining object attributes based on sensor data generated by a temporal sensor and known attributes associated with the object.

FIG. 6 is a pictorial flow diagram illustrating an example process 600 associated with determining object attributes based on sensor data generated by a temporal sensor and known attributes associated with the object. For instance, the sensor(s) 104 of the vehicle 102 may include a temporal sensor 202, such as a rotating lidar sensor, rolling shutter image sensor, etc. In examples, the temporal sensor 202 may be scanning in a certain scan direction 204 (e.g., clockwise, left-to-right, etc.).

The temporal sensor 202 may generate sensor data 106 (e.g., lidar data, image data, etc.) that includes a representation 112 of an object (e.g., the object 110(1) illustrated in FIG. 1). The representation 112 of the object shown in FIG. 6 is distorted such that the shape of the object is horizontally compressed relative to the real shape of the object. In some examples, distortion in the shape of the representation 112 of the object may be contributable to a trajectory of the object or the vehicle 102. For instance, if a direction of travel of the object is opposite to that of the scan direction 204 of the temporal sensor 202, then the temporal sensor 202 may have a tendency to scan the object faster than if the object were stationary. In other words, as time progresses from $T_X$ to $T_Y$ throughout the scan, the object moves through space in a direction different than the scan direction 204 such that the object passes through a line of sight of the temporal sensor 202 in a shorter amount of time than if the object were not in motion (or moving at a slower speed), and this causes the representation 112 to be compressed.

In some examples, the sensor data 106 may be sent to a classification component 602 of the vehicle 102. The classification component 602 may include functionality for determining a classification of the object. For instance, the classification component 602 may determine whether the object is a vehicle, a pedestrian, a cyclists, an animal, etc. Additionally, in some examples, the classification component 602 may include functionality to determine a specific make/manufacturer and/or model of a vehicle. In such cases, the classification component 602 may access one or more database(s) 604 storing attribute data 606 indicating known attribute(s) 608 associated with specific vehicle models. These known attribute(s) 608 may include attributes indicating, for specific vehicle makes/models, a width of the vehicle, a height of the vehicle, a length of the vehicle, size of components of the vehicle, such as wheel size, door size, window size, etc., and/or the like.

In some examples, the classification component 602 may obtain the attribute data 606 from the one or more database(s) 604 based at least in part on determining the specific make/manufacturer and/or model of a vehicle. Additionally, the classification component 602 may send or otherwise provide the attribute data 606, as well as, in some instances, the sensor data 106, to the perception component 120.

In some examples, the perception component 120 may utilize the attribute data 606 and/or the sensor data 106 to generate or otherwise determine the perception data 128. In some examples, the perception data 128 may include the one or more attribute(s) 130 associated with the object that are determined by the perception component 120, such as the velocity 132 of the object, the bounding box 134 associated with the object, the adjusted representation 136 of the object, a location of the object, an orientation of the object, and/or the like. In some examples, the bounding box 134 itself may be indicative of one or more of the attributes associated with the object, such as the location, the orientation, the size of the object, and the like.

In some examples, the perception component 120 may determine the attribute(s) 130 based on differences between the representation 112 of the object and the known attribute(s) 608 included in the attribute data 606. In some examples, the perception component 120 may determine a width of the bounding box 134 based on the known vehicle width or length included in the attribute data 606, depending on the orientation of the object. In some examples, the perception component may determine a height of the bounding box 134 based on a height of the representation 112 of the object in the sensor data 106 and/or based on the known vehicle height included in the attribute data 606. In some examples, the perception component 120 may determine the dimensions of the bounding box 134 based on the sensor data 106 and periodically check/verify the dimensions of the bounding box 134 over time based on the attribute data 606.

In some examples, because the vehicle width/length is known based on the attribute data 606, the perception component 120 may determine the velocity 132 of the object by determining a difference in angular width of the representation 112 minus the known width or length of the object (or component) included in the attribute data 606, and then dividing the difference by the amount of time the temporal sensor 202 spent scanning the whole object (or component) (e.g., from $T_X$ to $T_Y$). The velocity equation for such examples can be derived as:

$$\text{velocity} = \frac{(A_1 - A_0) - \text{width}}{T_Y - T_X}$$

In the above equation, "$T_X$" is the time at which the temporal sensor 202 started scanning the object, "$T_Y$" is the time at which the temporal sensor 202 finished scanning the object, "$A_0$" is the angle of the near side (start of scan) of the object relative to a line of sight of the temporal sensor 202 at time $T_X$, "$A_1$" is the angle of the far side (end of scan) of the object relative to the line of sight of the temporal sensor 202 at the time $T_Y$, and "width" is the known width or length of the object included in the attribute data 606. As another example with reference to the above equation, "$T_X$" may be the time at which the temporal sensor 202 started scanning a component of a vehicle (e.g., a wheel), "$T_Y$" is the time at which the temporal sensor 202 finished scanning the component of the vehicle, "$A_0$" is the angle of the near side (start of scan) of the component relative to a line of sight of the temporal sensor 202 at time $T_X$. "$A_1$" is the angle of the far side (end of scan) of the component relative to the line of sight of the temporal sensor 202 at the time $T_Y$, and "width" is the known width or length of the component of the vehicle included in the attribute data 606. In some examples, a distance to the object may need to be determined to solve for the velocity using the above equation. In the case of lidar data, the distance may be known or otherwise inherent in the sensor data itself. In contrast, in the case of image data, the distance may be unknown and may need to be determined. In examples, the velocity 132 may be a lateral velocity of the object. That is, the velocity 132 may be a component of a velocity vector where the component is perpendicular to a line of sight of the sensor or the vehicle.

Figure 7:
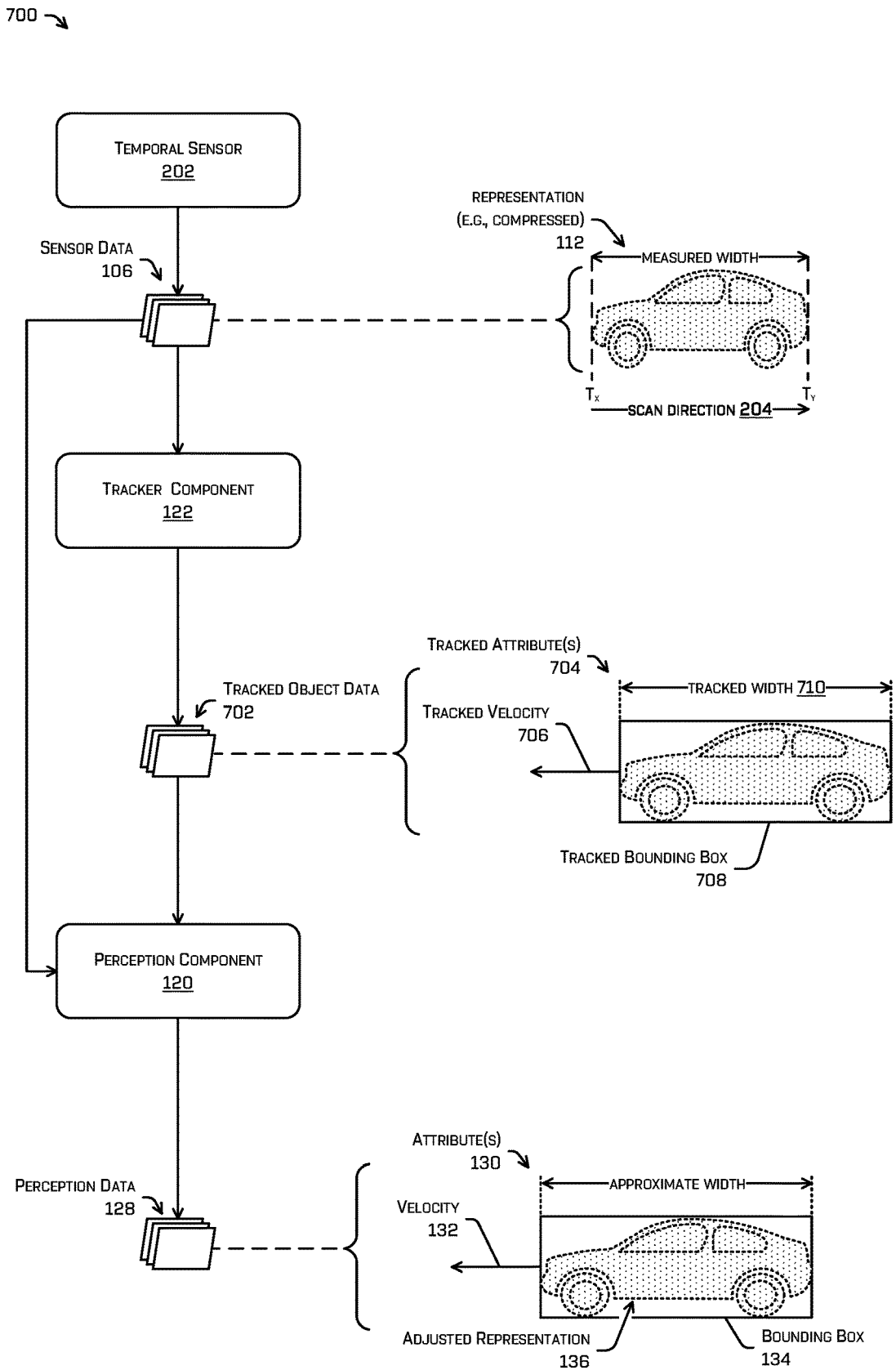
FIG. 7 is a pictorial flow diagram illustrating an example process associated with determining object attributes based on temporal sensor data and a determination that the object corresponds with a tracked object.

FIG. 7 is a pictorial flow diagram illustrating an example process 700 associated with determining object attributes based on temporal sensor data and a determination that the object corresponds with a tracked object. To begin, the temporal sensor 202 may generate sensor data 106 associated with an object in an environment. In some examples, the temporal sensor 202 may be a rolling shutter camera, a rotating lidar sensor, or the like. The temporal sensor 202 may be scanning in a particular scan direction 204 as shown (e.g., left-to-right).

The sensor data 106 (e.g., image data, lidar data, radar data, etc.) may include a representation 112 of the object. The representation 112 of the object shown may be distorted such that the shape of the object is different than the real shape of the object (e.g., compressed, elongated, skewed, etc.). In some examples, the compressed shape of the representation 112 of the object may be due to movement of the object or the vehicle 102. For instance, if the object is moving from right-to-left during a period of time (between $T_X$ and $T_Y$) in which the temporal sensor 202 is scanning the object, the representation 112 of the object can become distorted as shown. That is, as time progresses from $T_X$ to $T_Y$ throughout the scan, the object moves through space in a direction different than the scan direction 204 such that the object passes through the scan of the temporal sensor 202 in a shorter amount of time than if the object were not in motion (or moving at a slower speed), and this causes the representation 112 to be compressed. The same principle, but in reverse, may apply in cases where the direction of travel of an object is in the same direction as the scan direction 204, as the object will take more time to pass through the scan of the temporal sensor 202, as the scan "follows" the object.

In some examples, the sensor data 106 may be provided to the tracker component 122. The tracker component 122 may utilize the sensor data 106 to determine a track association between the object and a tracked object in the environment. That is, the tracker component 122 may determine, based at least in part on the sensor data 106, that the representation 112 of the object corresponds with a tracked object. In some examples, the tracker component 122 may determine that the representation 112 of the object corresponds with the tracked object based at least in part on a current location of the object being within a threshold distance of the tracked object, an orientation of the object being similar to a tracked orientation of the tracked object, a distance of the object, a size of the object in relation to the tracked object, and/or the like. Methods for determining whether an object corresponds with a tracked object are discussed in U.S. patent application Ser. No. 16/297,381, filed on Mar. 8, 2019, the entire contents of which are incorporated herein by reference in their entirety and for all purposes. In some examples, the tracker component 122 may output tracked object data 702 to the perception component 120. In some examples, the tracked object data 702 may include one or more tracked attribute(s) 704 associated with the tracked object. For instance, the tracked attribute(s) 704 may include a tracked velocity 706, a tracked bounding box 708, a tracked width 710, and/or other tracked attributes associated with the tracked object.

In some examples, in addition to receiving the sensor data 106 from the temporal sensor 202, the perception component 120 may also receive the tracked object data 702 from the tracker component 122. The perception component 120 may utilize the sensor data 106 and/or the tracked object data 702 to generate perception data 128. In some examples, the perception data 128 may include the one or more attribute(s) 130 associated with the object that are determined by the perception component 120, such as the velocity 132 of the object, the bounding box 134 associated with the object, the adjusted representation 136 of the object, a location of the object, an orientation of the object, and/or the like. In some examples, the bounding box 134 itself may be indicative of one or more of the attributes associated with the object, such as the location, the orientation, the size of the object, and the like.

In some examples, the perception component 120 may determine the attribute(s) 130 based on differences between the representation 112 of the object and the tracked attribute(s) 704 included in the tracked object data 702. In some examples, the perception component 120 may determine a width of the bounding box 134 based on the tracked width 710 and/or the tracked bounding box 708. In some examples, the perception component 120 may determine the velocity 132 of the object by determining a difference in angular width of the representation 112 minus the tracked width 710 of the tracked object, and then dividing the difference by the amount of time the temporal sensor 202 spent scanning the whole object (e.g., from $T_X$ to $T_Y$). The velocity equation for such examples can be derived as:

$$\text{velocity} = \frac{(A_1 - A_0) - \text{width}}{T_Y - T_X}$$

In the above equation, "$T_X$" is the time at which the temporal sensor 202 started scanning the object, "$T_Y$" is the time at which the temporal sensor 202 finished scanning the object, "$A_0$" is the angle of the near side (start of scan) of the object relative to a line of sight of the temporal sensor 202 at time $T_X$, "$A_1$" is the angle of the far side (end of scan) of the object relative to the line of sight of the temporal sensor 202 at the time $T_Y$, and "width" is the tracked width 710 of the tracked object included in the tracked object data 702. In examples, the velocity 132 may be a lateral velocity of the object. That is, the velocity 132 may be a component of a velocity vector where the component is perpendicular to a line of sight of the sensor or the vehicle.

Figure 8:
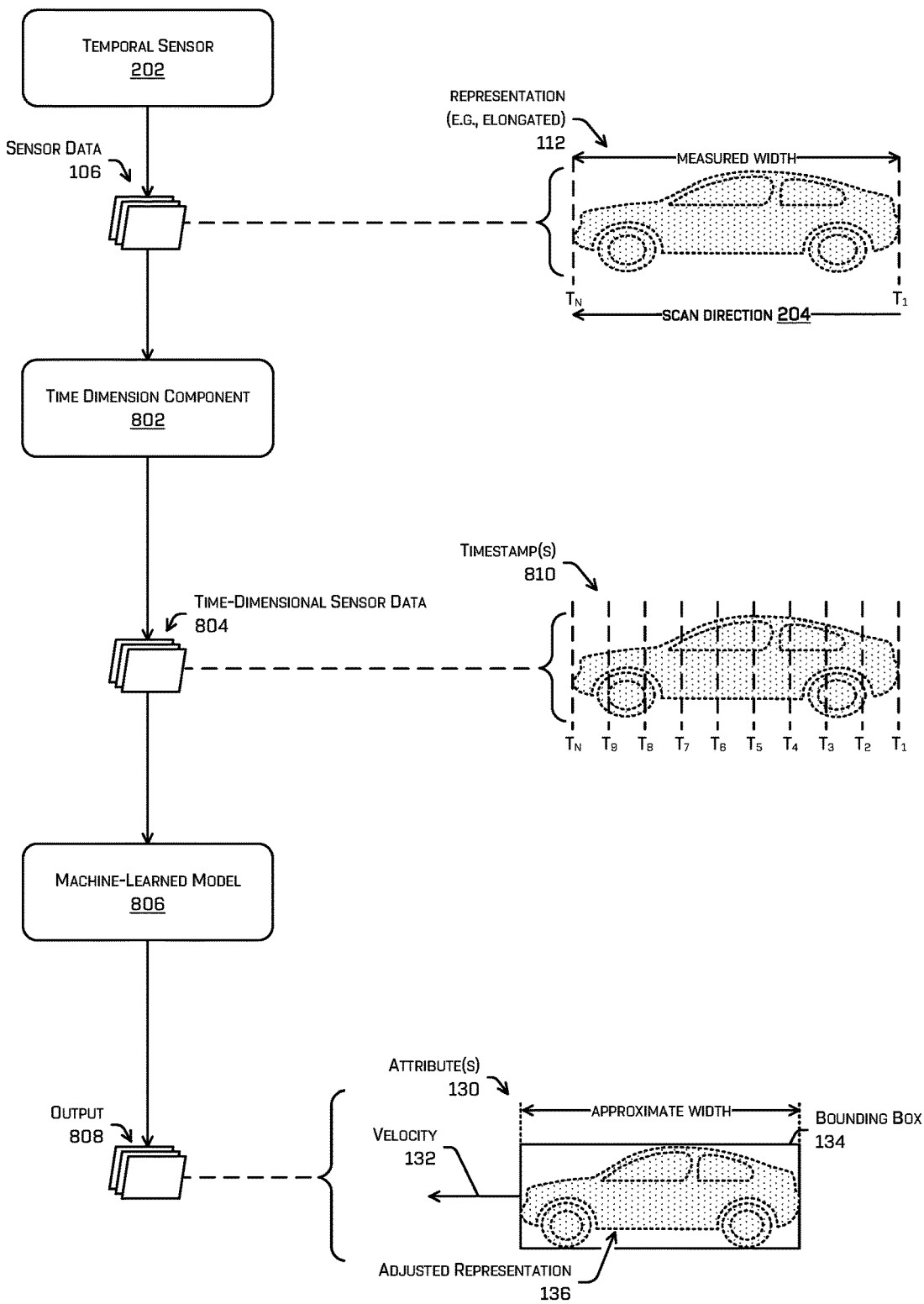
FIG. 8 is a pictorial flow diagram illustrating an example pipeline associated with using a machine-learned model to determine object attributes based on temporal sensor data.

FIG. 8 is a pictorial flow diagram illustrating an example pipeline 800 associated with using a machine-learned model to determine object attributes based on temporal sensor data. The temporal sensor 202 may generate sensor data 106 that includes a representation 112 of the object. The representation 112 of the object is distorted such that the shape of the object is elongated relative to a real shape of the object (e.g., the measured width is greater than the approximate width). In some examples, the elongated shape of the representation 112 of the object may be due to movement of the object or the vehicle 102. For instance, if a direction of travel of the object is the same as that of the scan direction 204 of the temporal sensor 202, then the temporal sensor 202 may have a tendency to scan the object for a longer period of time than if the object were stationary (or moving in the opposite direction). In other words, as time progresses from $T_1$ to $T_N$ throughout the scan, the object moves through space in the same direction as that of the scan direction 204 such that the object remains within a line of sight of the temporal sensor 202 for a longer period of time than if the object were not in motion (or moving in the opposite direction, at a slower speed, etc.), and this causes the representation 112 to be elongated.

In some examples, the sensor data 106 may be provided to a time-dimensional component 802. The time-dimensional component 802 may include functionality for generating time-dimensional sensor data 804 indicating respective timestamp(s) 810 during which specific portions of the sensor data 106 were generated by the temporal sensor 202. As such, the time-dimensional sensor data 804 is indicative of the movement of the object through space over some time period (e.g., in this case, from $T_1$-$T_N$). In examples, the time-dimensional component 802 may generate or otherwise determine the time-dimensional sensor data 804 by formatting the temporal sensor data 202 with an additional temporal dimension. For instance, if the sensor data 106 is a lidar point cloud including multiple lidar points associated with three spatial dimensions, these lidar points may be represented in four dimensions by the time-dimensional component 802 with the fourth dimension being the relative time at which a lidar point was generated/captured.

In some examples, the time-dimensional sensor data 84 may be input into a machine-learned model 806. In some examples, the machine-learned model 806 may include one or more neural network(s) designed for object detection. In at least one examples, the one or more neural network(s) may detect and segment the time-dimensional sensor data 804 that is made up of the representation 112 of the object (e.g., the geometry of the object) and the relative position of each sensor data 106 point in the time period of a scan (e.g., from $T_1$ to $T_N$). In some examples, the machine-learned model 806 may be configured or otherwise trained to determine, as an output 808, the attribute(s) 130 of the object. For instance, the machine-learned model 806 may be configured to determine the velocity 132, bounding box 134, adjusted representation 136, approximate width, position, extent, orientation, etc, associated with the object. In at least one examples, the machine-learned model 806 may be associated with or apart of the perception component 120.

In general, object detection and segmentation can be done with neural networks because there is a wide variety in the shapes of objects that should be detected in an environment, and it may by difficult to tune a heuristic system to accomplish this. Many current approaches may have slight errors in the dimensions of obstacles due to the distortions caused by scanning sensors. In cases where machine-learned models learn precise shapes of vehicles, they too may even learn to be invariant to the distortions from scanning sensors. However, as is the case in this application, if the input data to these models are structured to incorporate the temporal dimension (e.g., such as is the time-dimensional sensor data 804), it may not be necessary for machine-learned models to learn to handle these distortions because the input data itself is no longer distorted.

Figure 9:
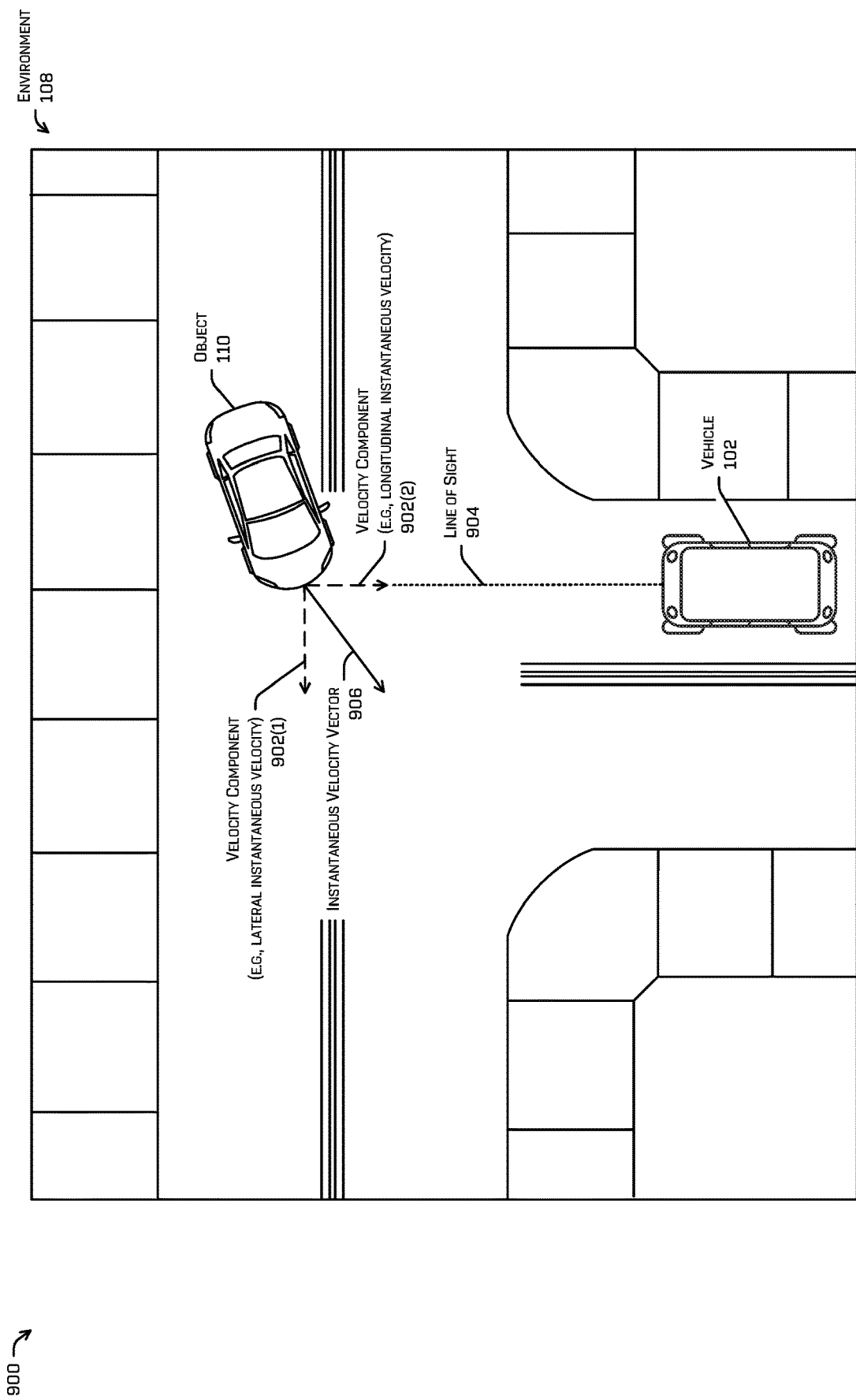
FIG. 9 is a top-down scene illustrating velocity components of an object in an environment. The velocity components include a velocity component that is perpendicular to a line of sight of the vehicle and which may be determined using the techniques described herein.

FIG. 9 is a top-down scene 900 illustrating velocity components of an object 110 in an environment. The velocity components include a first velocity component 902(1) that is perpendicular to a line of sight 904 of the vehicle 102 (or to a sensor of the vehicle), and which may be determined using the techniques described herein. In some instances, the first velocity component 902(1) may also be referred to herein as a lateral instantaneous velocity of the object 110, lateral component, perpendicular component of a velocity vector, or the like. Additionally, the velocity components include a second velocity component 902(2) that is parallel to the line of sight 904. In some examples, the second velocity component 902(2) may be determined using conventional techniques, such as with radar. The second velocity component 902(2) may be referred to herein, in some instances, as a longitudinal instantaneous velocity, or the like.

In some examples, the object 110 may be following a trajectory through the environment 108. In some examples, a combination or sum of the velocity components 902(1) and 902(2) may be equal to an instantaneous velocity vector 906 associated with the object 110, as shown.

FIGS. 10-13 are flowcharts illustrating example processes 1000, 1100, 1200, and 1300 according to the various technologies disclosed herein. By way of example, the processes 1000, 1100, 1200, and 1300 are illustrated as logical flow graphs, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the processes 1000, 1100, 1200, and 1300, the order in which the operations are described is not intended to be construed as a limitation, and any number of the described operations can be combined (or omitted) in any order and/or in parallel to implement the processes 1000, 1100, 1200, and 1300. In some examples, multiple branches represent alternate implementations that may be used separately or in combination with other operations discussed herein. The processes 1000, 1100, 1200, and 1300 illustrated may be described with reference to components and elements described above with reference to FIGS. 1-8 for convenience and ease of understanding. However, the processes 1000, 1100, 1200, and 1300 are not limited to being performed using these components, and the components are not limited to performing the processes 1000, 1100, 1200, and 1300.

Figure 10:
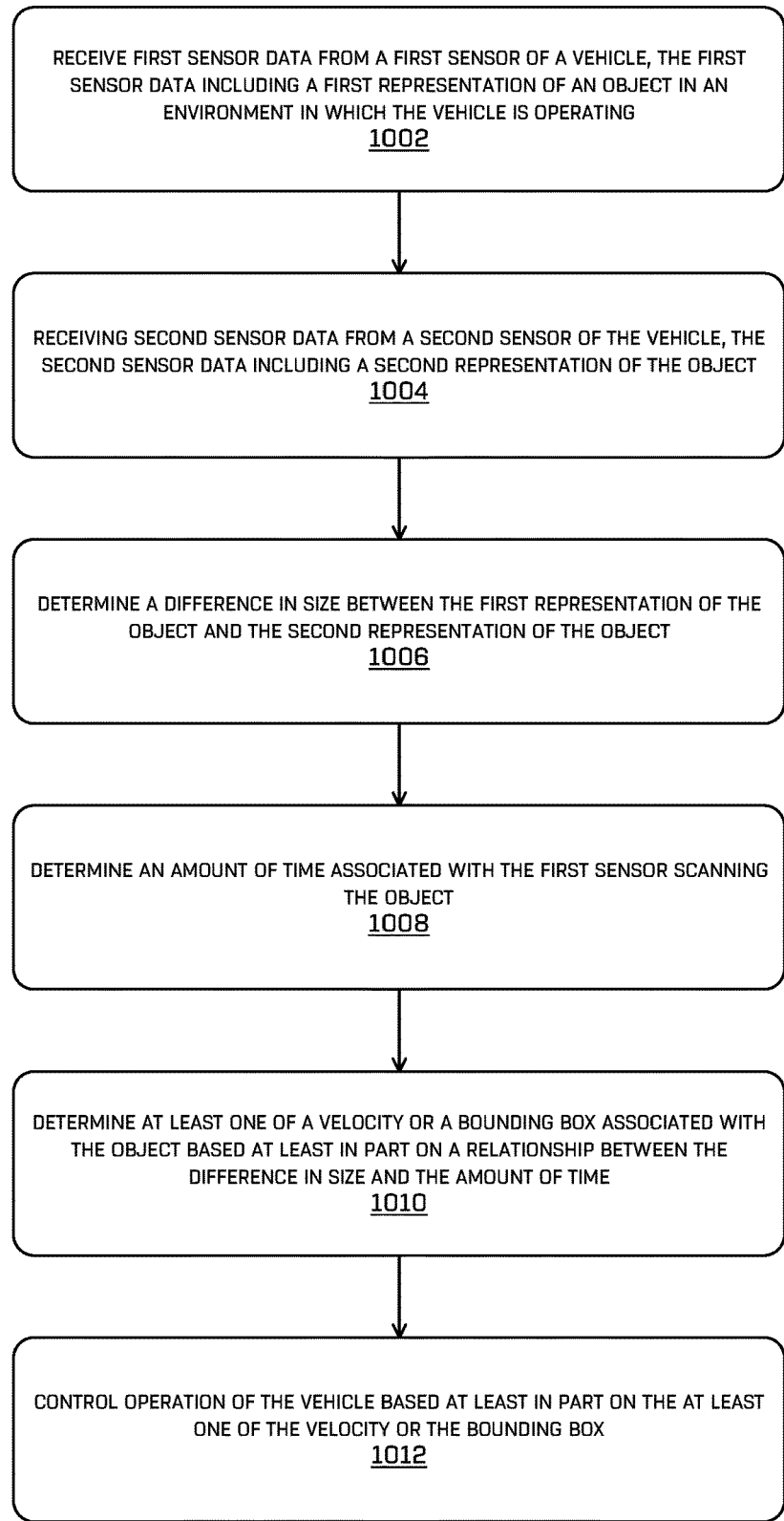
FIG. 10 is a flowchart illustrating an example process associated with the technologies disclosed herein for determining object attributes based on distortions in temporal sensor data.

FIG. 10 is a flowchart illustrating an example process 1000 associated with the technologies disclosed herein for determining object attributes based on distortions in temporal sensor data. The process 1000 begins at operation 1002, which includes receiving first sensor data from a first sensor of a vehicle, the first sensor data including a first representation of an object in an environment in which the vehicle is operating. For instance, the perception component 120 may receive the first sensor data 106(1) from the first temporal sensor 202(1) of the vehicle 102.

At operation 1004, the process 1000 includes receiving second sensor data from a second sensor of the vehicle, the second sensor data including a second representation of the object. For instance, the perception component 120 may receive the second sensor data 106(2) from the second temporal sensor 202(2) of the vehicle 102, or from the instantaneous sensor 302.

At operation 1006, the process 1000 includes determining a difference in size between the first representation of the object and the second representation of the object. For instance, the perception component 120 may determine the difference in size between the first representation 112(1) of the object and the second representation 112(2) of the object.

At operation 1008, the process 1000 includes determining an amount of time associated with the first sensor scanning the object. For instance, the perception component 120 may determine the amount of time associated with the first temporal sensor 202(1) scanning the object.

At operation 1010, the process 1000 includes determining at least one of a velocity or a bounding box associated with the object based at least in part on a relationship between the difference in size and the amount of time. For instance, the perception component 120 may determine the velocity 132 or the bounding box 134 (as well as other attribute(s) 130) associated with the object based on the relationship between the difference in size and the amount of time.

At operation 1012, the process 1000 includes controlling operation of the vehicle based at least in part on the at least one of the velocity or the bounding box. For instance, the planner component 126 may control operation of the vehicle 102 based at least in part on the at least one of the velocity 132 or the bounding box 134 (or other attribute(s) 130).

Figure 11:
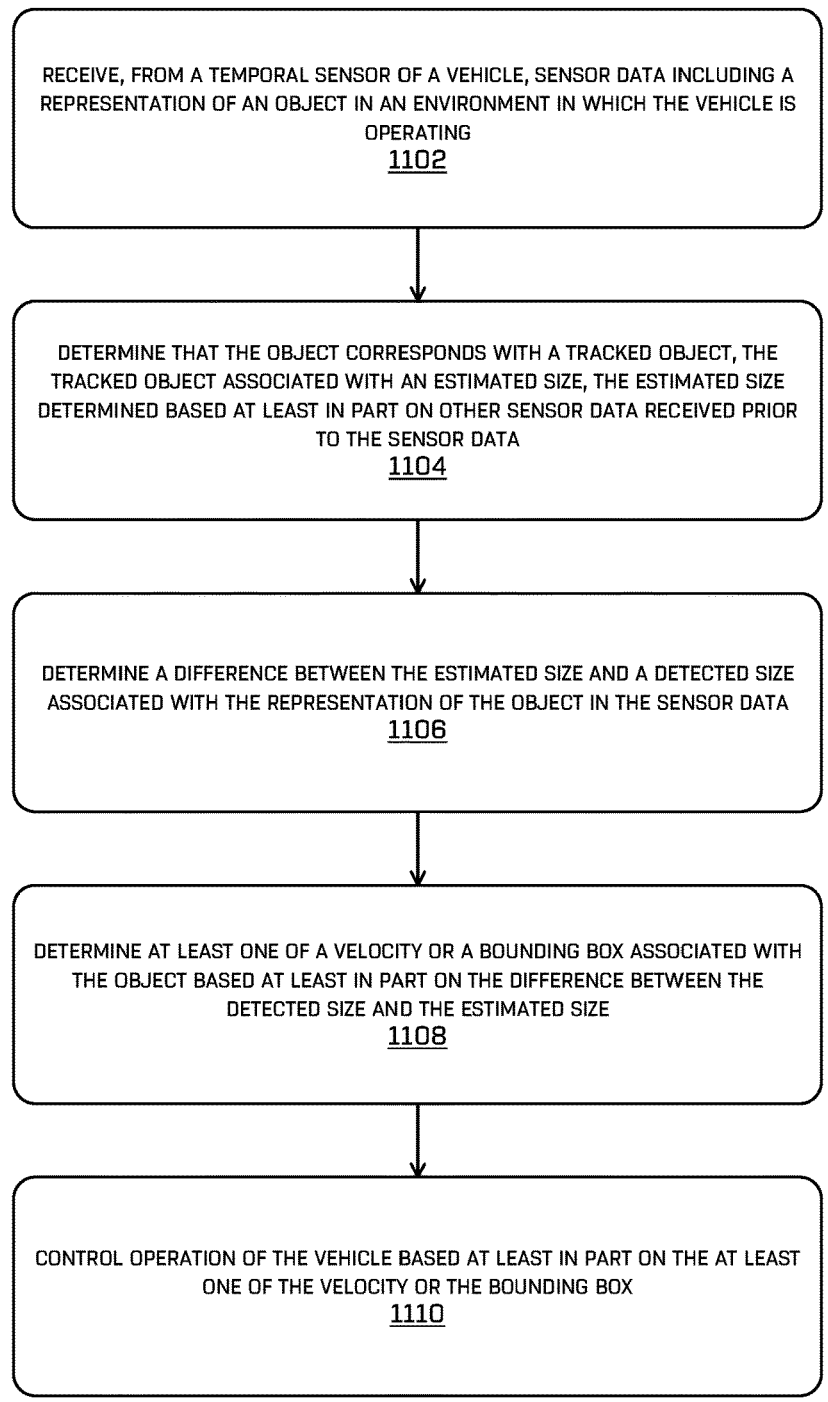
FIG. 11 is a flowchart illustrating an example process associated with the technologies disclosed herein for determining object attributes based on temporal sensor data and a determination that the object corresponds with a tracked object.

FIG. 11 is a flowchart illustrating an example process 1100 associated with the technologies disclosed herein for determining object attributes based on temporal sensor data and a determination that the object corresponds with a tracked object. The process 1100 begins at operation 1102, which includes receiving, from a temporal sensor of a vehicle, sensor data including a representation of an object in an environment in which the vehicle is operating. For instance, the perception component 120 and/or the tracker component 122 may receive the sensor data 106 including the representation 112 of the object 110 in the environment 108 in which the vehicle 102 is operating.

At operation 1104, the process 1100 includes determining that the object corresponds with a tracked object, the tracked object associated with an estimated size, the estimated size determined based at least in part on other sensor data received prior to the sensor data. For instance, the tracker component 122 may determine that the object 110 corresponds with the tracked object that is associated with tracked size determined based on previous sensor data.

At operation 1106, the process 1100 includes determining a difference between the estimated size and a detected size associated with the representation of the object in the sensor data. For instance, the perception component 120 may determine the difference between the estimated size (e.g., tracked width) of the object 110 and the detected size (e.g., measured width) associated with the representation 112 of the object 110 in the sensor data 106.

At operation 1108, the process 1100 includes determining at least one of a velocity or a bounding box associated with the object based at least in part on the difference between the detected size and the estimated size. For instance, the perception component 120 may determine at least one of the velocity 132 or the bounding box 134 (or other attributes) associated with the object 110 based at least in part on the difference between the detected size (e.g., measured width) and the estimated size (e.g., tracked width 710).

At operation 1110, the process 1100 includes controlling operation of the vehicle based at least in part on the at least one of the velocity or the bounding box. For instance, the planner component 126 may control operation (e.g., a trajectory) of the vehicle 102 based at least in part on one of the attribute(s) 130, such as the velocity 132 or the bounding box 134.

Figure 12:
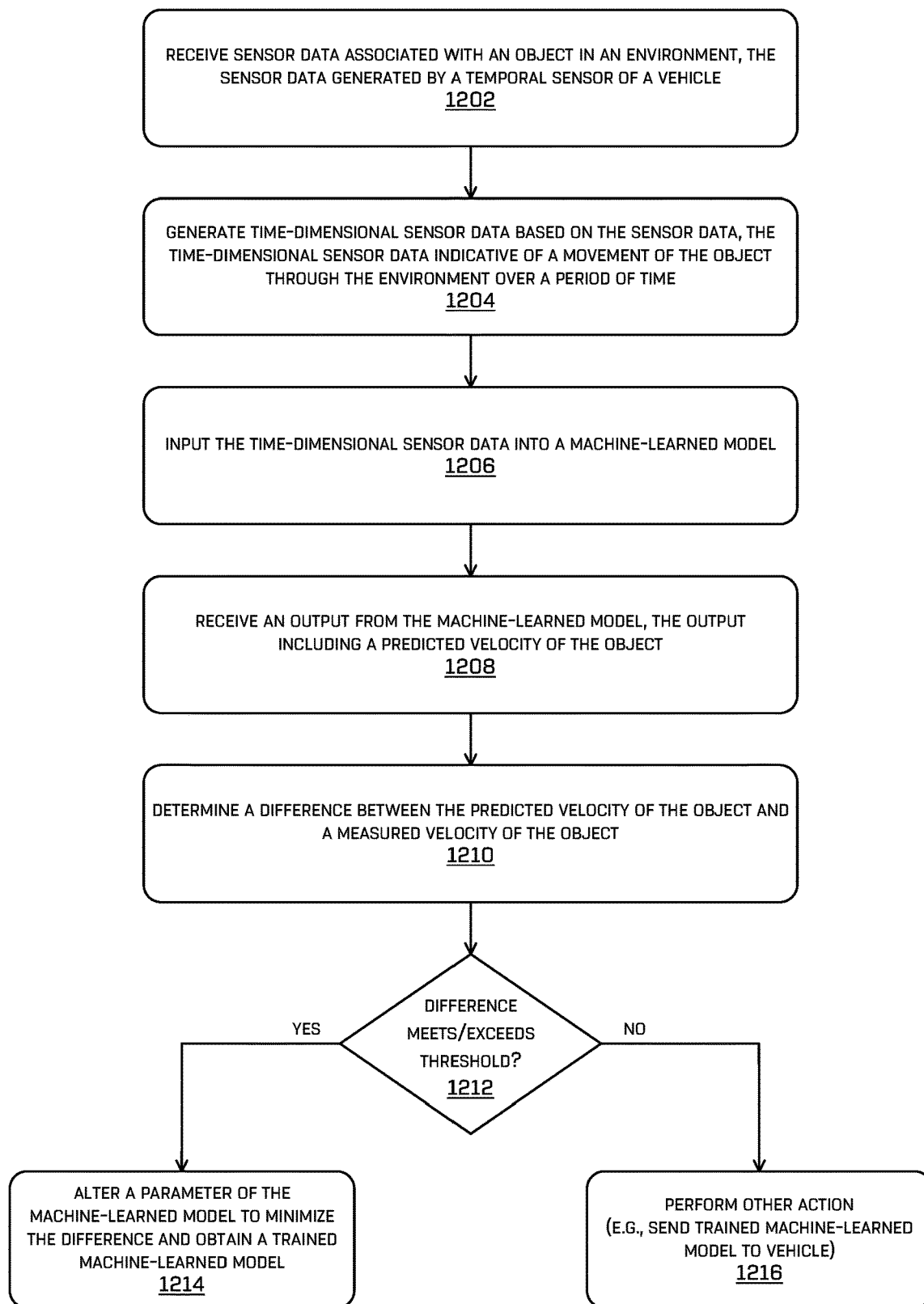
FIG. 12 is a flowchart illustrating an example process associated with the technologies disclosed herein for training a machine-learned model to predict attributes associated with objects based on temporal sensor data.

FIG. 12 is a flowchart illustrating an example process 1200 associated with the technologies disclosed herein for training a machine-learned model to predict attributes associated with objects based on temporal sensor data. The process 1200 begins at operation 1202, which includes receiving sensor data associated with an object in an environment, the sensor data generated by a temporal sensor of a vehicle. For instance, the time-dimensional component 802 may receive the sensor data 106 associated with the object 110 in the environment 108. The sensor data 106 may be generated by the temporal sensor 202.

At operation 1204, the process 1200 includes generating time-dimensional sensor data based on the sensor data, the time-dimensional sensor data indicative of a movement of the object through the environment over a period of time. For instance, the time-dimensional component 802 may generate the time-dimensional sensor data 804 based on the sensor data 106, and the time-dimensional sensor data 804 may be indicative of movement of the object 110 through the environment 108.

At operation 1206, the process 1200 includes inputting the time-dimensional sensor data into a machine-learned model. For instance, the time-dimensional component 802 (or another component or computing device) may input the time-dimensional sensor data 804 into the machine-learned model 806.

At operation 1208, the process 1200 includes receiving an output from the machine-learned model, the output including a predicted velocity of the object. For instance, the output 808 may be received from the machine-learned model 806 that includes the predicted velocity 132 of the object 110. In some examples, the output 808 may be received by a training component associated with the vehicle 102, the training component configured to train machine-learned models.

At operation 1210, the process 1200 includes determining a difference between the predicted velocity of the object and a measured velocity of the object. For instance, the training component may determine the difference between the predicted velocity 132 and a measured velocity of the object 110. In some examples, the measured velocity may be measured by a radar sensor or computed by the training component based on one or more types of sensor data associated with the object.

At operation 1212, the process 1200 includes determining whether the difference meets or exceeds a threshold difference. If the difference meets or exceeds the threshold difference, the process 1200 proceeds to operation 1214. Alternatively, if the difference is less than the threshold difference, the process 1200 proceeds to operation 1216. In some examples, the threshold velocity difference may be a difference of 0.5 meters per second (m/s), 1 m/s, 2 m/s, or the like.

At operation 1214, the process 1200 includes altering a parameter of the machine-learned model to minimize the difference and obtain a trained machine-learned model. For instance, the machine-learned model training component may alter the parameter of the machine-learned model 806 to minimize the difference and obtain the trained machine-learned model.

At operation 1216, the process 1200 includes performing another action, such as sending the trained machine-learned model to the vehicle. For instance, the machine-learned model training component may send the trained machine-learned model to the vehicle 102 for use by the vehicle 102 to traverse the environment 108 and determine attribute(s) 130 associated with objects 110 in the environment 108.

Figure 13:
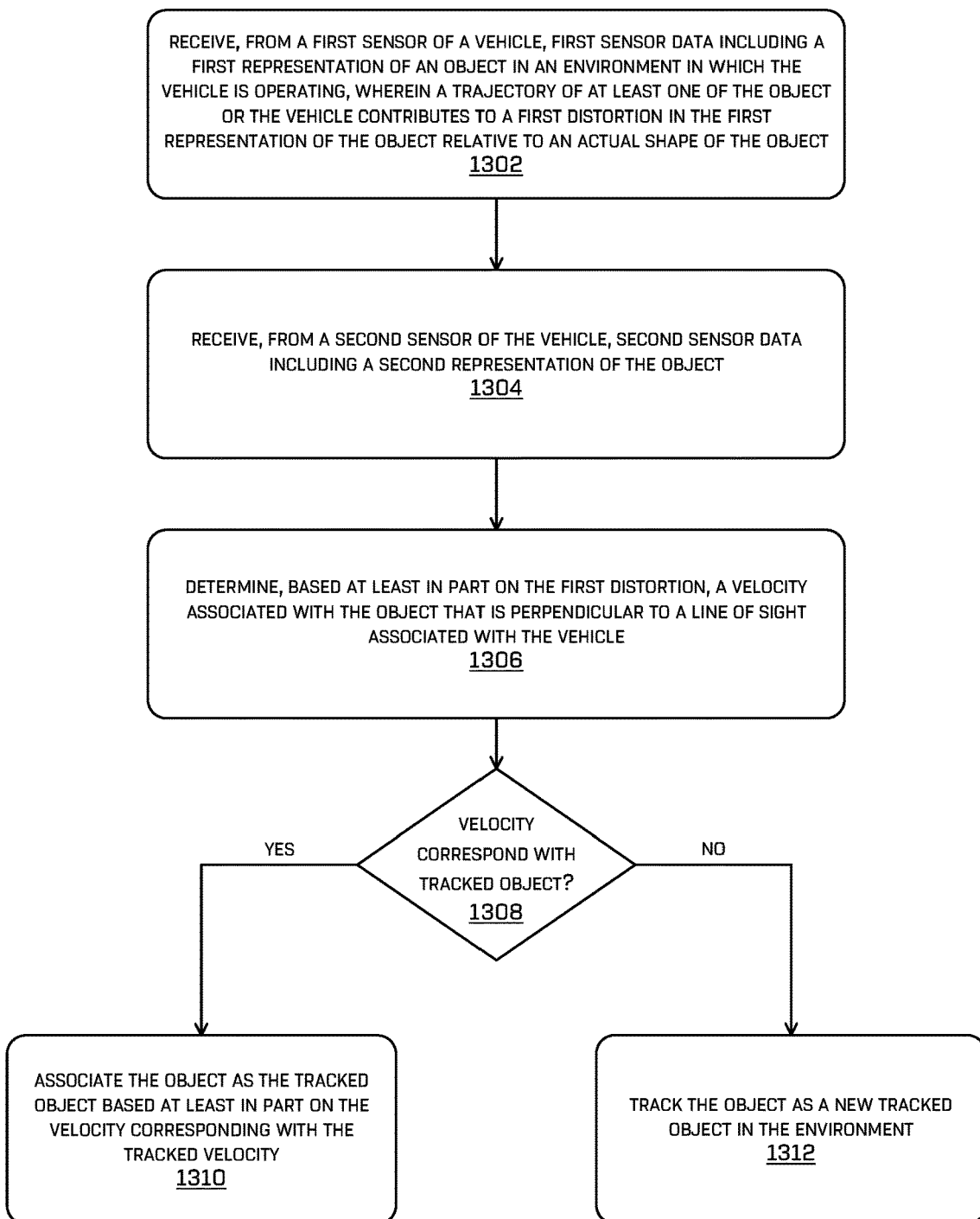
FIG. 13 is a flowchart illustrating an example process associated with the technologies disclosed herein for tracking an object based on determining a velocity of the object using temporal sensor data.

FIG. 13 is a flowchart illustrating an example process 1300 associated with the technologies disclosed herein for tracking an object based on determining a velocity of the object using temporal sensor data. The process 1300 begins at operation 1302, which includes receiving, from a first sensor of a vehicle, first sensor data including a first representation of an object in an environment in which the vehicle is operating, wherein a trajectory of at least one of the object or the vehicle contributes to a first distortion in the first representation of the object relative to an actual shape of the object. For instance, the perception component 120 may receive the first sensor data 106(1) from the first temporal sensor 202(1) of the vehicle 102. The first sensor data 106(1) may include the first representation 112(1) of the object 110.

At operation 1304, the process 1300 includes receiving, from a second sensor of the vehicle, second sensor data including a second representation of the object. For instance, the perception component 120 may receive the second sensor data 106(2) from the second temporal sensor 202(2) of the vehicle 102, or from the instantaneous sensor 302.

At operation 1306, the process 1300 includes determining, based at least in part on the first distortion, a velocity associated with the object that is perpendicular to a line of sight associated with the vehicle. For instance, the perception component 120 may determine the velocity 132 associated with the object 110 based on at least the first distortion. Additionally, the perception component 120 may determine the velocity based on a difference between the first representation of the object and the second representation of the object.

At operation 1308, the process 1300 includes determining whether the velocity corresponds with a tracked velocity of a tracked object. If the velocity does correspond with the tracked velocity, the process 1300 proceeds to operation 1310. Alternatively, if the velocity does not correspond with the tracked velocity, the process 1300 proceeds to operation 1312.

At operation 1310, the process 1300 includes associating the object as the tracked object based at least in part on the velocity corresponding with the tracked velocity. For instance, the tracker component 122 may associate the object 110 as the tracked object based at least in part on the velocity 132 corresponding with the tracked velocity 706.

At operation 1312, the process 1300 includes tracking the object as a new tracked object in the environment. For instance, the tracker component 122 may track the object 110 as the new tracked object. Additionally, the tracker component 122 may associate the new tracked object with the velocity 132 as the tracked velocity 706, a bounding box 134 as the tracked bounding box 708, and the like.

Figure 14:
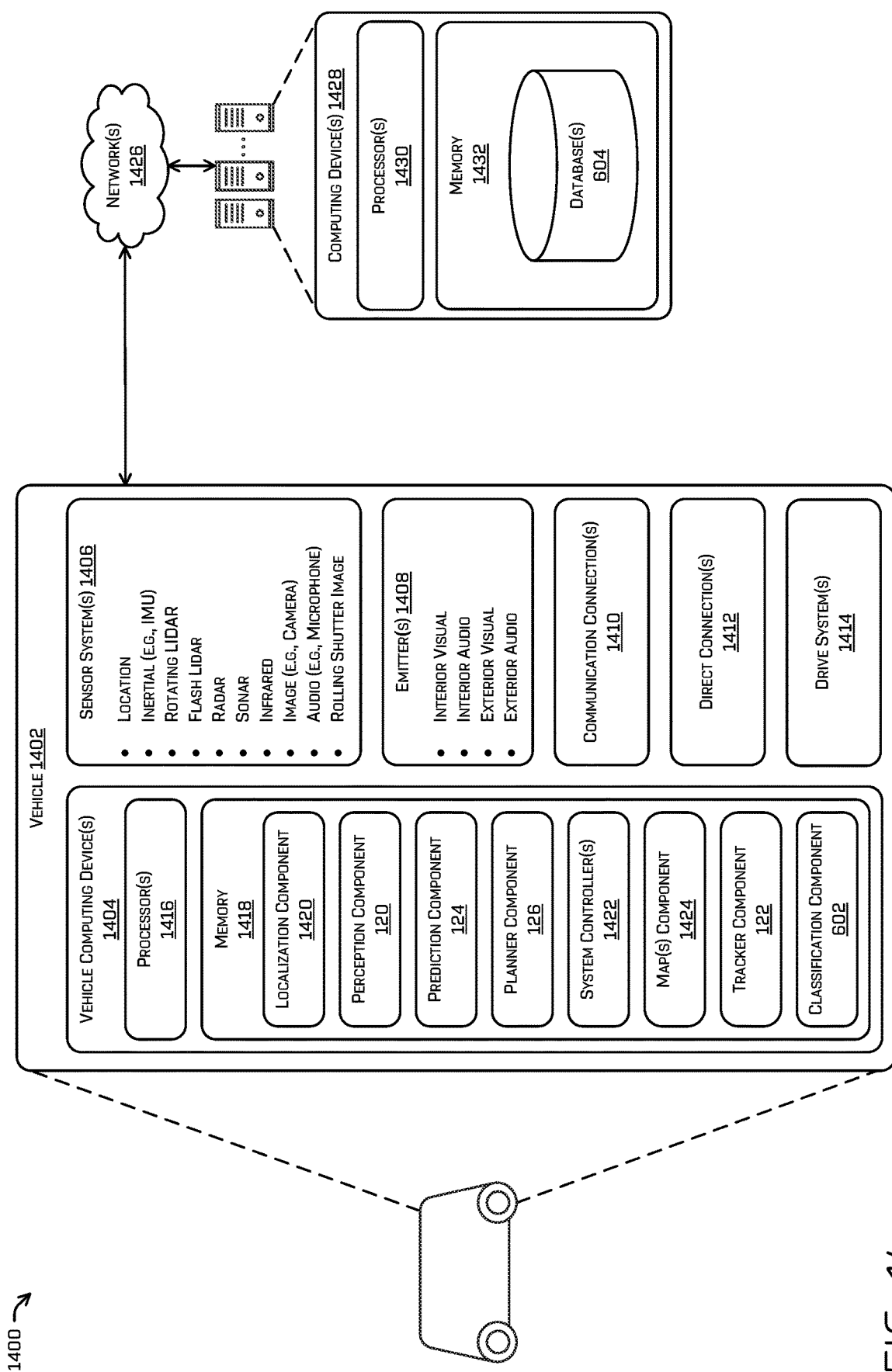
FIG. 14 is a block diagram illustrating an example system that may be used for performing the techniques described herein.

FIG. 14 is a block diagram illustrating an example system that may be used for performing the techniques described herein. In at least one example, a vehicle 1402, which can correspond to the vehicle 102 described above with reference to FIGS. 1-13, can include one or more vehicle computing device(s) 1404, one or more sensor system(s) 1406, one or more emitter(s) 1408, one or more communication connection(s) 1410, one or more direct connection(s) 1412, and one or more drive system(s) 1414.

In at least one example, a vehicle 1402 can be an autonomous vehicle configured to operate according to a classification issued by the U.S. National Highway Traffic Safety Administration, which describes a vehicle capable of performing all safety-critical functions without the driver (or occupant) being expected to control the vehicle at any time. In such an example, since the vehicle 1402 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled.

That is, in the illustrated example, the vehicle 1402 is an autonomous vehicle: however, the vehicle 1402 could be any other type of vehicle. While only a single vehicle 1402 is illustrated in FIG. 14, in a practical application, the example system 1400 can include a plurality of vehicles, which, in some examples, can comprise a fleet of vehicles.

The vehicle computing device(s) 1404 can include processor(s) 1416 and memory 1418 communicatively coupled with the processor(s) 1416. In the illustrated example, the memory 1418 of the vehicle computing device(s) 1404 stores the localization component 1420, the perception component 120, the prediction component 124, the planner component 126, one or more system controller(s) 1422, a map(s) component 1424, the tracker component 122, and the classification component 602.

In at least one example and as described above, the localization component 1420 can determine a pose (position and orientation) of the vehicle 1402 in relation to a local and/or global map based at least in part on sensor data received from the sensor system(s) 1406 and/or map data associated with a map of an environment in which the vehicle 1402 is operating (e.g., provided by the map(s) component 1424). In at least one example, the localization component 1420 can include, or be associated with, a calibration component that is capable of performing operations for calibrating (determining various intrinsic and extrinsic parameters associated with any one or more of the sensor system(s) 1406), localizing, and mapping substantially simultaneously.

In at least one example, the perception component 120 can perform object detection, segmentation, and/or classification based at least in part on sensor data received from the sensor system(s) 1406. In at least one example, the perception component 120 can receive raw sensor data from the sensor system(s) 1406. In at least one example, the perception component 120 can receive sensor data and can utilize one or more processing algorithms and/or machine-learned models to perform object detection, segmentation, and/or classification with respect to object(s) identified in the sensor data. In some examples, the perception component 120 can associate a bounding region (e.g., bounding box or otherwise an instance segmentation) with an identified object and can associate a confidence score associated with a classification of the identified object with the identified object. In at least one example, the perception component 120 can determine object attributes based on distortions in temporal sensor data. In examples, the perception component 120 can include one or more machine-learned models, such as the machine-learned model 806 described herein.

The prediction component 124 can receive sensor data from the sensor system(s) 1406, map data, and/or perception data output from the perception component 120 (e.g., processed sensor data), and can output predictions associated with one or more objects within the environment of the vehicle 1402. Predictions can include predicted trajectories associated with objects in the environment in which the vehicle 1402 is operating.

The planner component 126 may receive data, information, and/or outputs from the localization component 1420, the perception component 120, the prediction component 124, and/or the map(s) component 1424 and may generate one or more proposed vehicle operations (e.g., proposed trajectories). Additional details of localization components, perception components, prediction components, and/or planner components that are usable can be found in U.S. Pat. No. 9,1412,123, issued on Apr. 4, 2017, and U.S. Pat. No. 10,3143,390, issued on Jul. 16, 2019, the entire contents of both of which are incorporated by reference herein in their entirety and for all purposes.

In at least one example, the vehicle computing device(s) 1404 can include one or more system controller(s) 1422, which can be configured to control steering, propulsion, braking, safety, emitters, communication, and other systems of the vehicle 1402. These system controller(s) 1422 can communicate with and/or control corresponding systems of the drive system(s) 1414 and/or other systems of the vehicle 1402.

The map(s) component 1424 may store one or more map(s) associated with an environment in which the vehicle 1402 operates. In some examples, the map(s) component 1424 may include functionality to generate new maps representing an environment in real-time as the vehicle 1402 operates, update maps associated with the environment, or the like.

While the components described above are illustrated as "onboard" the vehicle 1402, in other implementations, the components can be remotely located and/or accessible to the vehicle 1402. For instance, some or all of the components can be remotely located on the computing device(s) 1428 and accessible to the vehicle 1402 via one or more network(s) 1426. Furthermore, while the components are described above as "components," such components can comprise one or more components and/or modules, which can be part of a system, for performing operations attributed to each of the components.

In at least one example, the localization component 1420, the perception component 120, the prediction component 124, the planner component 126, the system controller(s) 1422, the map(s) component 1424, the tracker component 122, and/or the classification component 602 can process data, as described above, and can send their respective outputs over the network(s) 1426, to computing device(s) 1428. In at least one example, the localization component 1420, the perception component 120, the prediction component 124, the planner component 126, the system controller(s) 1422, the map(s) component 1424, the tracker component 122, and/or the classification component 602 can send their respective outputs to the computing device(s) 1428 at a particular frequency, after a lapse of a predetermined period of time, in near real-time, etc.

In at least one example, the sensor system(s) 1406 can include lidar sensors (e.g., rotating lidar sensors, flash lidar sensors), radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.). ToF sensors, rolling shutter image sensors, etc. The sensor system(s) 1406 can provide input to the vehicle computing device(s) 1404. In some examples, the sensor system(s) 1406 can preprocess at least some of the sensor data prior to sending the sensor data to the vehicle computing device(s) 1404. In at least one example, the sensor system(s) 1406 can send sensor data, via the network(s) 1426, to the computing device(s) 1428 at a particular frequency, after a lapse of a predetermined period of time, in near real-time, etc.

The vehicle 1402 can also include one or more emitters 1408 for emitting light and/or sound, as described above. The emitter(s) 1408 in this example include interior audio and visual emitters to communicate with passengers of the vehicle 1402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1408 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 1408 can be positioned at various locations about the exterior and/or interior of the vehicle 1402.

The vehicle 1402 can also include communication connection(s) 1410 that enable communication between the vehicle 1402 and other local or remote computing device(s), such as the computing device(s) 1428, as well as other remote or local computing device(s). For instance, the communication connection(s) 1410 can facilitate communication with other local computing device(s) on the vehicle 1402 and/or the drive system(s) 1414. Also, the communication connection(s) 1410 can allow the vehicle to communicate with other nearby computing device(s) (e.g., other nearby vehicles, traffic signals, etc.). The communications connection(s) 1410 also enable the vehicle 1402 to communicate with a remote teleoperations computing device or other remote services.

The communications connection(s) 1410 can include physical and/or logical interfaces for connecting the vehicle computing device(s) 1404 to another computing device or a network, such as network(s) 1426. For example, the communications connection(s) 1410 can enable Wi-Fi-based communication such as via frequencies defined by the IEEE 1402.11 standards, short range wireless frequencies such as BLUETOOTH®, or any suitable wired or wireless communications protocol that enables the respective computing device to interface with the other computing device(s).

The direct connection(s) 1412 can directly connect the drive system(s) 1414 and other systems of the vehicle 1402. In at least one example, the vehicle 1402 can include drive system(s) 1414. In some examples, the vehicle 1402 can have a single drive system 1414. In at least one example, if the vehicle 1402 has multiple drive systems 1414, individual drive systems 1414 can be positioned on opposite ends of the vehicle 1402 (e.g., the front and the rear, etc.). In at least one example, the drive system(s) 1414 can include sensor component(s) to detect conditions of the drive system(s) 1414 and/or the surroundings of the vehicle 1402. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 1414. In some cases, the sensor component(s) on the drive system(s) 1414 can overlap or supplement corresponding systems of the vehicle 1402 (e.g., sensor system(s) 1406).

The drive system(s) 1414 can include many of the vehicle systems, including a high voltage battery, a motor to propel the vehicle 1402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1414 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 1414. Furthermore, the drive system(s) 1414 also include communication connection(s) that enable communication by the respective drive system with other local or remote computing device(s).

In FIG. 14, the vehicle computing device(s) 1404, sensor system(s) 1406, emitter(s) 1408, and the communication connection(s) 1410 are shown onboard the vehicle 1402. However, in some examples, the vehicle computing device(s) 1404, sensor system(s) 1406, emitter(s) 1408, and the communication connection(s) 1410 can be implemented outside of an actual vehicle (i.e., not onboard the vehicle 1402).

As described above, the vehicle 1402 can send data to the computing device(s) 1428, via the network(s) 1426. In some examples, the vehicle 1402 can send raw sensor data to the computing device(s) 1428. In other examples, the vehicle 1402 can send processed sensor data and/or representations of sensor data to the computing device(s) 1428 (e.g., data output from the localization component 1420, the perception component 120, the prediction component 124, the planner component 126, machine-learned models, etc.). In some examples, the vehicle 1402 can send data to the computing device(s) 1428 at a particular frequency, after a lapse of a predetermined period of time, in near real-time, etc.

The computing device(s) 1428 can receive the data (raw or processed) from the vehicle 1402 and/or other data collection devices, as well as data from one or more third party sources and/or systems. In at least one example, the computing device(s) 1428 can include processor(s) 1430 and memory 1432 communicatively coupled with the processor(s) 1428. In the illustrated example, the memory 1432 of the computing device(s) 1428 stores the one or more database(s) 604, which can store the attribute data 606.

The processor(s) 1416 of the vehicle 1402 and the processor(s) 1430 of the computing device(s) 1428 can be any suitable processor capable of executing instructions to process data and perform operations as described herein. By way of example and not limitation, the processor(s) 1416 and 1430 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1418 and 1432 are examples of non-transitory computer-readable media. Memory 1418 and 1432 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 14 is illustrated as a distributed system, in some examples, components of the vehicle 1402 can be associated with the computing device(s) 1428 and/or the components of the computing device(s) 1428 can be associated with the vehicle 1402. That is, the vehicle 1402 can perform one or more of the functions associated with the computing device(s) 1428, and vice versa.

Furthermore, while the vehicle computing device(s) 1404 and the computing device(s) 1428 are shown to include multiple components, in some examples, such components can be associated with more or fewer individual components. For example, the localization component 1420, the perception component 120, the prediction component 124, the planner component 126, the map(s) component 1424, the tracker component 122, and/or the classification component 602 can be combined into a single component. That is, while depicted as separate components, any one or more of the components can be combined.

Example Clauses

A. A system comprising: one or more processors; and one or more non-transitory computer-readable media storing instructions that, when executed by the one or more processors, cause the system to perform operations comprising: receiving, from a first temporal sensor of a vehicle, first sensor data including a first representation of an object in an environment in which the vehicle is operating, wherein a movement of at least one of the object or the vehicle contributes to a first distortion in the first representation of the object relative to an actual shape of the object: receiving, from a second temporal sensor of the vehicle, second sensor data including a second representation of the object, wherein the movement of the at least one of the object or the vehicle contributes to a second distortion in the second representation of the object relative to the actual shape of the object: determining a difference in size between the first representation of the object and the second representation of the object, the difference in size contributable to a first scanning direction of the first sensor being different than a second scanning direction of the second sensor: determining a difference in time between a first amount of time associated with the first sensor scanning the object and a second amount of time associated with the second sensor scanning the object: determining at least one of a velocity or a bounding box associated with the object based at least in part on a relationship between the difference in size and the difference in time; and controlling operation of the vehicle based at least in part on the at least one of the velocity or the bounding box.

B. The system as recited in paragraph A, wherein the difference in size is contributable to the movement of the at least one of the object or the vehicle, and a magnitude of the difference in size is proportional to the velocity of the object or the vehicle.

C. The system as recited in any one of paragraphs A-B, wherein the first temporal sensor is a first rotating lidar sensor and the second temporal sensor is a second rotating lidar sensor, the first rotating lidar sensor rotating in the first scanning direction and the second rotating lidar sensor rotating in the second scanning direction that is opposite the first scanning direction.

D. The system as recited in any one of paragraphs A-C, wherein the difference in size is a difference in width between a first width associated with the first representation of the object and a second width associated with the second representation of the object.

E. A method comprising: receiving sensor data including a representation of a portion of an object, the sensor data generated by a temporal sensor of a vehicle, wherein a movement of at least one of the object or the vehicle contributes to a distortion in the representation of the portion of the object; and determining at least one of a velocity or a size associated with the object from a perspective of the vehicle based at least in part on a difference between the representation of the portion of the object and another representation of the portion of the object in other sensor data generated by another sensor of the vehicle.

F. The method as recited in paragraph E, wherein the distortion in the portion of the representation of the object is a distortion in a shape of the portion of the representation of the object relative to an actual shape of the portion of the object.

G. The method as recited in any one of paragraphs E-F, further comprising determining a difference in time between a first amount of time associated with the temporal sensor scanning the portion of the object and a second amount of time associated with the other sensor scanning the portion of the object, wherein the at least one of the velocity or the size is determined based at least in part on the difference in time.

H. The method as recited in any one of paragraphs E-G, wherein the other sensor of the vehicle is an instantaneous sensor such that the other representation of the portion of the object in the other sensor data corresponds with an actual shape of the portion of the object from the perspective of the vehicle.

I. The method as recited in any one of paragraphs E-H, wherein the other sensor of the vehicle is another temporal sensor and the movement of the at least one of the object or the vehicle contributes to another distortion in the other representation of the portion of the object in the other sensor data.

J. The method as recited in any one of paragraphs E-I, wherein the temporal sensor scans in a first direction and the other temporal sensor scans in a second direction that is different than the first direction.

K. The method as recited in any one of paragraphs E-J, wherein the temporal sensor and the other sensor are at least one of rotating lidar sensors or rolling shutter image sensors and the sensor data is at least one of lidar data or image data.

L. The method as recited in any one of paragraphs E-K, further comprising determining a distance between the object and the vehicle, wherein determining the at least one of the velocity or the size associated with the object is further based at least in part on the distance.

M. The method as recited in any one of paragraphs E-L, wherein the difference between the representation of the portion of the object and the other representation of the portion of the object is a difference in at least one of orientation or position between the representation of the portion of the object and the other representation of the portion of the object.

N. The method as recited in any one of paragraphs E-M, wherein the determining the at least one of the velocity or the size associated with the object comprises determining a velocity value of a component of a velocity vector associated with the object, the component being perpendicular to a line of sight associated with the temporal sensor and the other sensor.

O. One or more non-transitory computer-readable media storing instructions that, when executed, cause one or more computing devices to perform operations comprising: receiving sensor data including a representation of a portion of an object, the sensor data generated by a temporal sensor of a vehicle, wherein a movement of at least one of the object or the vehicle contributes to a distortion in the representation of the portion of the object; and determining at least one of a velocity or a size associated with the object from a perspective of the vehicle based at least in part on a difference between the representation of the portion of the object and another representation of the portion of the object in other sensor data generated by another sensor of the vehicle.

P. The one or more non-transitory computer-readable media as recited in paragraph O, wherein the distortion in the representation of the portion of the object is a distortion in a shape of the portion of the object relative to an actual shape of the object from the perspective of the vehicle.

Q. The one or more non-transitory computer-readable media as recited in any one of paragraphs O-P, further comprising determining a difference in time between a first amount of time associated with the temporal sensor scanning the portion of the object and a second amount of time associated with the other sensor scanning the portion of the object, wherein the at least one of the velocity or the size is determined based at least in part on the difference in time.

R. The one or more non-transitory computer-readable media as recited in any one of paragraphs O-Q, wherein the other sensor of the vehicle is an instantaneous sensor such that the other representation of the portion of the object in the other sensor data corresponds with an actual shape of the portion of the object from the perspective of the vehicle.

S. The one or more non-transitory computer-readable media as recited in any one of paragraphs O-R, wherein the other sensor of the vehicle is another temporal sensor and the movement of the at least one of the object or the vehicle contributes to another distortion in the other representation of the portion of the object in the other sensor data.

T. The one or more non-transitory computer-readable media as recited in any one of paragraphs O-S, wherein the temporal sensor scans in a first direction and the other temporal sensor scans in a second direction that is different than the first direction.

U. A system comprising: one or more processors; and one or more non-transitory computer-readable media storing instructions that, when executed by the one or more processors, cause the system to perform operations comprising: receiving, from a temporal sensor of a vehicle, first sensor data including a representation of an object in an environment in which the vehicle is operating, wherein a movement of at least one of the object or the vehicle contributes to a distortion in the representation of the object relative to an actual shape of the object: determining, based at least in part on the first sensor data, that the object corresponds with a tracked object, the tracked object associated with an estimated size determined based at least in part on second sensor data received prior to the first sensor data: determining a difference between the estimated size and a detected size associated with the representation of the object in the first sensor data: determining at least one of a velocity or a bounding box associated with the object based at least in part on the difference between the detected size and the estimated size; and controlling operation of the vehicle based at least in part on the at least one of the velocity or the bounding box.

V. The system as recited in paragraph U, the operations further comprising determining a length of a period of time associated with the temporal sensor completing a scan of the object, wherein determining the at least one of the velocity or the bounding box is further based at least in part on the length of the period of time.

W. The system as recited in any one of paragraphs U-V, the operations further comprising determining, based at least in part on an orientation and distance of the object in the first sensor data, an angular width associated with the object, wherein determining the at least one of the velocity or the bounding box is further based at least in part on the angular width.

X. The system as recited in any one of paragraphs U-W, the operations further comprising: estimating a tracked bounding box associated with the tracked object over a period of time in which the vehicle is operating in the environment, the tracked bounding box indicative of the estimated size: determining, based at least in part on the first sensor data, a distorted bounding box associated with the object, the distorted bounding box contributable to the first sensor data including the distortion in the representation of the object; and wherein determining the bounding box associated with the object is further based at least in part on a difference between the distorted bounding box and the tracked bounding box.

Y. A method comprising: receiving sensor data including a representation of a portion of an object, the sensor data generated by a temporal sensor of a vehicle, wherein a movement of at least one of the object or the vehicle contributes to a distortion in the representation of the object: determining an estimated size of the portion of the object; determining a difference between the estimated size and a detected size of the representation of the portion of the object; and determining at least one of a velocity or a bounding box associated with the object based at least in part on the difference.

Z. The method as recited in paragraph Y, wherein determining the estimated size of the portion of the object comprises determining, based at least in part on the sensor data, that the object corresponds with a tracked object, the tracked object associated with the estimated size determined based at least in part on previously received sensor data.

AA. The method as recited in any one of paragraphs Y-Z, wherein the object is another vehicle and determining the estimated size of the portion of the object comprises: determining a vehicle model associated with the other vehicle; and obtaining size information associated with the vehicle model, the size information including an actual size of a portion of the vehicle that corresponds with the portion of the object.

BB. The method as recited in any one of paragraphs Y-AA, further comprising determining a length of a period of time associated with the temporal sensor scanning the portion of the object, wherein determining the at least one of the velocity or the bounding box is further based at least in part on the length of the period of time.

CC. The method as recited in any one of paragraphs Y-BB, further comprising determining, based at least in part on the sensor data, an angular width associated with the portion of the object, wherein determining the at least one of the velocity or the bounding box is further based at least in part on the angular width.

DD. The method as recited in any one of paragraphs Y-CC, wherein the distortion in the representation of the portion of the object is relative to an actual shape of the portion of the object, a magnitude of the distortion being proportional to the velocity associated with the object or the vehicle.

EE. The method as recited in any one of paragraphs Y-DD, wherein the temporal sensor comprises at least one of a rotating lidar sensor or a rolling shutter image sensor, and wherein the sensor data comprises at least one of lidar data or image data.

FF. The method as recited in any one of paragraphs Y-EE, wherein the difference between the estimated size of the portion of the object and the detected size of the representation of the portion of the object is a difference between an estimated width of the portion of the object and a detected width of the representation of the portion of the object.

GG. The method as recited in any one of paragraphs Y-FF, wherein the determining the at least one of the velocity or the bounding box associated with the object comprises determining a velocity value of a component of a velocity vector associated with the object, the component being perpendicular to a line of sight associated with the temporal sensor.

HH. The method as recited in any one of paragraphs Y-GG, further comprising: determining a classification of the object using a vision modality associated with the vehicle; and based at least in part on the classification, obtaining size information indicative of the estimated size of the portion of the object from a database accessible to a computing device of the vehicle, the database storing respective size information associated with multiple respective objects.

II. One or more non-transitory computer-readable media storing instructions that, when executed, cause one or more computing devices to perform operations comprising: receiving sensor data including a representation of a portion of an object, the sensor data generated by a temporal sensor of a vehicle, wherein a movement of at least one of the object or the vehicle contributes to a distortion in the representation of the portion of the object; determining an estimated size of the portion of the object: determining a difference between the estimated size and a detected size of the representation of the portion of the object; and determining at least one of a velocity or a bounding box associated with the object based at least in part on the difference.

JJ. The one or more non-transitory computer-readable media as recited in paragraph II, wherein determining the estimated size of the portion of the object comprises determining, based at least in part on the sensor data, that the object corresponds with a tracked object, the tracked object associated with the estimated size determined based at least in part on previously received sensor data.

KK. The one or more non-transitory computer-readable media as recited in any one of paragraphs II-JJ, wherein the object is another vehicle and determining the estimated size of the portion of the object comprises: determining a vehicle model associated with the other vehicle; and obtaining size information associated with the vehicle model, the size information including an actual size of a portion of the vehicle that corresponds with the portion of the object.

LL. The one or more non-transitory computer-readable media as recited in any one of paragraphs II-KK, the operations further comprising determining a length of a period of time associated with the temporal sensor scanning the portion of the object, wherein determining the at least one of the velocity or the bounding box is further based at least in part on the length of the period of time.

MM. The one or more non-transitory computer-readable media as recited in any one of paragraphs II-LL, the operations further comprising determining, based at least in part on the sensor data, an angular width associated with the portion of the object, wherein determining the at least one of the velocity or the bounding box is further based at least in part on the angular width.

NN. The one or more non-transitory computer-readable media as recited in any one of paragraphs II-MM, wherein the distortion in the representation of the portion of the object is relative to an actual shape or size of the portion of the object, a magnitude of the distortion being proportional to the velocity associated with the object or the vehicle.

OO. A system comprising: one or more processors; and one or more non-transitory computer-readable media storing instructions that, when executed by the one or more processors, cause the system to perform operations comprising: receiving sensor data associated with an object in an environment, the sensor data generated by a temporal sensor of a vehicle, wherein a movement of the object or the vehicle contributes to a distortion in a representation of the object in the sensor data relative to an actual shape of the object; generating time-dimensional sensor data based on the sensor data, the time-dimensional sensor data indicative of the movement of the object through the environment over a period of time; inputting the time-dimensional sensor data into a machine-learned model: receiving an output from the machine-learned model, the output including a predicted velocity of the object; determining a difference between the predicted velocity of the object and a measured velocity of the object; and based at least in part on the difference meeting or exceeding a threshold difference, altering a parameter of the machine-learned model to minimize the difference and obtain a trained machine-learned model.

PP. The system as recited in paragraph OO, wherein the time-dimensional sensor data includes a temporal dimension indicating respective points in time at which respective portions of the sensor data were captured by the temporal sensor.

QQ. The system as recited in any one of paragraphs OO-PP, wherein the output further includes a predicted bounding box associated with the object, the predicted bounding box indicative of one or more of a size of the object, a location of the object, or an orientation of the object, the operations further comprising: determining another difference between the predicted bounding box and a ground truth bounding box associated with the object; and altering at least one of the parameter or another parameter of the machine-learned model to minimize the other difference.

RR. The system as recited in any one of paragraphs OO-QQ, wherein the temporal sensor is a rotating lidar sensor, the sensor data is a lidar point cloud, and the generating the time-dimensional sensor data comprises associating respective timestamps with respective points of the lidar point cloud.

SS. A method comprising: receiving sensor data associated with an object; generating time-dimensional sensor data based on the sensor data, the time-dimensional sensor data indicative of a movement of the object through space over a period of time: inputting the time-dimensional sensor data into a machine-learned model: receiving an output from the machine-learned model, the output including a predicted attribute associated with the object; determining a difference between the predicted attribute and a measured attribute of the object; and based at least in part on the difference meeting or exceeding a threshold difference, altering a parameter of the machine-learned model to minimize the difference and obtain a trained machine-learned model.

TT. The method as recited in paragraph SS, wherein the time-dimensional sensor data includes a temporal dimension indicating respective points in time at which respective portions of the sensor data were captured by a temporal sensor.

UU. The method as recited in any one of paragraphs SS-TT, wherein the predicted attribute of the object comprises at least one of a size of the object, a location of the object, an orientation of the object, or a velocity of the object.

VV. The method as recited in any one of paragraphs SS-UU, wherein the predicted attribute of the object comprises a value of a component of a velocity vector associated with the object, the component being perpendicular to a line of sight of a temporal sensor that generated the sensor data.

WW. The method as recited in any one of paragraphs SS-VV, wherein the sensor data is a lidar point cloud generated by a rotating lidar sensor and generating the time-dimensional sensor data comprises associating a respective timestamp with individual points of the lidar point cloud.

XX. The method as recited in any one of paragraphs SS-WW, wherein the sensor data is image data generated by a rolling shutter image sensor and generating the time-dimensional sensor data comprises associating a respective timestamp with a pixel or line of pixels of the image data.

YY. The method as recited in any one of paragraphs SS-XX, wherein the sensor data is generated by a temporal sensor of a vehicle and a trajectory of at least one of the object or the vehicle contributes to a distortion in a representation of the object in the sensor data relative to an actual shape or size of the object.

ZZ. The method as recited in any one of paragraphs SS-YY, further comprising causing the machine-learned model to be sent to a vehicle, the machine-learned model to be used by the vehicle to traverse an environment.

AAA. One or more non-transitory computer-readable media storing instruction that, when executed, cause one or more computing device to perform operations comprising: receiving sensor data associated with an object: generating time-dimensional sensor data based on the sensor data, the time-dimensional sensor data indicative of a movement of the object through space over a period of time: inputting the time-dimensional sensor data into a machine-learned model: receiving an output from the machine-learned model, the output including a predicted attribute associated with the object: determining a difference between the predicted attribute and a measured attribute of the object; and based at least in part on the difference meeting or exceeding a threshold difference, altering a parameter of the machine-learned model to minimize the difference and obtain a trained machine-learned model.

BBB. The one or more non-transitory computer-readable media as recited in paragraph AAA, wherein the time-dimensional sensor data includes a temporal dimension indicating respective points in time at which respective portions of the sensor data were captured by a temporal sensor.

CCC. The one or more non-transitory computer-readable media as recited in any one of paragraphs AAA-BBB, wherein the predicted attribute of the object comprises at least one of a size of the object, a location of the object, an orientation of the object, or a velocity of the object.

DDD. The one or more non-transitory computer-readable media as recited in any one of paragraphs AAA-CCC, wherein the predicted attribute of the object comprises a value of a component of a velocity vector associated with the object, the component being perpendicular to a line of sight of a temporal sensor that generated the sensor data.

EEE. The one or more non-transitory computer-readable media as recited in any one of paragraphs AAA-DDD, wherein the sensor data is a lidar point cloud generated by a rotating lidar sensor and the generating the time-dimensional sensor data comprises associating a respective timestamp with individual points of the lidar point cloud.

FFF. The one or more non-transitory computer-readable media as recited in any one of paragraphs AAA-EEE, wherein the sensor data is image data generated by a rolling shutter image sensor and the generating the time-dimensional sensor data comprises associating a respective timestamp with a pixel or group of pixels of the image data.

GGG. The one or more non-transitory computer-readable media as recited in any one of paragraphs AAA-FFF, wherein the sensor data is generated by a temporal sensor of a vehicle and a trajectory of at least one of the object or the vehicle contributes to a distortion in a representation of the object in the sensor data relative to an actual shape or size of the object.

HHH. The one or more non-transitory computer-readable media as recited in any one of paragraphs AAA-GGG, further comprising causing the machine-learned model to be sent to a vehicle, the machine-learned model to be used by the vehicle to traverse an environment.

III. A system comprising: one or more processors; and one or more non-transitory computer-readable media storing instructions that, when executed by the one or more processors, cause the system to perform operations comprising: receiving, from a first sensor of a vehicle, first sensor data representing an object in an environment in which the vehicle is operating, wherein a movement of at least one of the object or the vehicle contributes to a distortion in a representation of the object: determining, based at least in part on the first sensor data, a lateral instantaneous velocity component associated with the object, the lateral instantaneous velocity component perpendicular to a line of sight associated with the first sensor: receiving, from a second sensor of the vehicle, second sensor data indicative of a longitudinal instantaneous velocity component, the longitudinal instantaneous velocity component parallel to the line of sight: determining a predicted trajectory of the object based at least in part on the lateral instantaneous velocity component and the longitudinal instantaneous velocity component; and controlling operation of the vehicle based at least in part on the predicted trajectory of the object.

JJJ. The system as recited in paragraph III, wherein the first sensor data is at least one of lidar data generated by a rotating lidar sensor or image data generated by a rolling shutter image sensor.

KKK. The system as recited in any one of paragraphs III-JJJ, wherein the lateral instantaneous velocity component is determined based at least in part on: a difference between the distortion in the representation of the object and an actual shape of the object from a perspective of the vehicle: a length of a period of time associated with the first sensor scanning the object; and a distance between the vehicle and the object.

LLL. The system as recited in any one of paragraphs III-KKK, the operations further comprising determining, based at least in part on the lateral instantaneous velocity component, that the object corresponds with a tracked object, wherein the predicted trajectory of the object is determined based at least in part on associating the lateral instantaneous velocity with the tracked object.

MMM. A method comprising: receiving sensor data generated by a temporal sensor of a vehicle operating in an environment: determining a lateral instantaneous velocity associated with an object in the environment, at least a portion of the object being represented in the sensor data: determining, based at least in part on the lateral instantaneous velocity, a predicted trajectory of the object; and controlling operation of the vehicle based at least in part on the predicted trajectory.

NNN. The method as recited in paragraph MMM, wherein the lateral instantaneous velocity is perpendicular to a line of sight associated with the temporal sensor.

OOO. The method as recited in any one of paragraphs MMM-NNN, wherein the lateral instantaneous velocity is a component of a velocity vector associated with the object, the component perpendicular to another component of the velocity vector that is parallel to a line of sight associated with the temporal sensor.

PPP. The method as recited in any one of paragraphs MMM-OOO, wherein a velocity magnitude of the other component of the velocity vector that is parallel to the line of sight is determined based at least in part on radar data received from a radar sensor of the vehicle.

QQQ. The method as recited in any one of paragraphs MMM-PPP, further comprising determining, based at least in part on the lateral instantaneous velocity, that the object corresponds with a tracked object.

RRR. The method as recited in any one of paragraphs MMM-QQQ, wherein the lateral instantaneous velocity is determined based at least in part on a distortion associated with the at least the portion of the object represented in the sensor data, the distortion contributable to a movement of at least one of the object or the vehicle during a scan of the temporal sensor.

SSS. The method as recited in any one of paragraphs MMM-RRR, wherein the distortion is at least one of a distortion in shape of the at least the portion of the object relative to an actual shape of the at least the portion of the object from a perspective of the vehicle.

TTT. The method as recited in any one of paragraphs MMM-SSS, wherein a magnitude of the distortion is proportional to a magnitude of the lateral instantaneous velocity associated with the object.

UUU. The method as recited in any one of paragraphs MMM-TTT, wherein determining the lateral instantaneous velocity associated with the object is further based at least in part on a length of a period of time associated with the temporal sensor scanning the at least the portion of the object.

VVV. One or more non-transitory computer-readable media storing instructions that, when executed, cause one or more computing devices to perform operations comprising: receiving sensor data generated by a temporal sensor of a vehicle operating in an environment; determining a lateral instantaneous velocity associated with an object in the environment, at least a portion of the object being represented in the sensor data: determining, based at least in part on the lateral instantaneous velocity, a predicted trajectory of the object; and controlling operation of the vehicle based at least in part on the predicted trajectory.

WWW. The one or more non-transitory computer-readable media as recited in paragraph VVV, wherein the lateral instantaneous velocity is perpendicular to a line of sight associated with the temporal sensor.

XXX. The one or more non-transitory computer-readable media as recited in any one of paragraphs VVV-WWW, wherein the lateral instantaneous velocity is a component of a velocity vector associated with the object, the component perpendicular to another component of the velocity vector that is parallel to a line of sight associated with the temporal sensor.

YYY. The one or more non-transitory computer-readable media as recited in any one of paragraphs VVV-XXX, wherein a velocity magnitude of the other component of the velocity vector that is parallel to the line of sight is determined based at least in part on other sensor data received from a radar sensor of the vehicle.

ZZZ. The one or more non-transitory computer-readable media as recited in any one of paragraphs VVV-YYY, the operations further comprising determining, based at least in part on the lateral instantaneous velocity, that the object corresponds with a tracked object.

AAAA. The one or more non-transitory computer-readable media as recited in any one of paragraphs VVV-ZZZ, wherein the lateral instantaneous velocity is determined based at least in part on a distortion associated with the at least the portion of the object represented in the sensor data, the distortion contributable to a movement of at least one of the object or the vehicle during a scan of the temporal sensor.

BBBB. The one or more non-transitory computer-readable media as recited in any one of paragraphs VVV-AAAA, wherein determining the lateral instantaneous velocity associated with the object is further based at least in part on a length of a period of time associated with the temporal sensor scanning the at least the portion of the object.

While the example clauses described above are described with respect to one particular implementation, it should be understood that, in the context of this document, the content of the example clauses can also be implemented via a method, device, system, computer-readable medium, and/or another implementation. Additionally, any of examples A-BBBB may be implemented alone or in combination with any other one or more of the examples A-BBBB.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving, from a temporal sensor of a vehicle and during a first time period, first sensor data including a representation of an object in an environment in which the vehicle is operating, wherein a movement of at least one of the object or the vehicle contributes to a distortion in the representation of the object relative to an actual shape of the object;
determining, based at least in part on the first sensor data, that the object corresponds with a tracked object, the tracked object associated with an estimated size determined based at least in part on second sensor data captured during a second time period, prior to the first time period;
determining a difference between the estimated size and a detected size associated with the representation of the object in the first sensor data;
determining at least one of a velocity or a bounding box associated with the object based at least in part on the difference between the detected size and the estimated size; and
controlling operation of the vehicle based at least in part on the at least one of the velocity or the bounding box.

2. The system of claim 1, wherein:
a length of the first time period is associated with the temporal sensor completing a scan of the object, and wherein
determining the at least one of the velocity or the bounding box is further based at least in part on the length.

3. The system of claim 1, the operations further comprising:
determining, based at least in part on an orientation and distance of the object relative to the temporal sensor indicated in the first sensor data, an angular width associated with the object,
wherein determining the at least one of the velocity or the bounding box is further based at least in part on the angular width.

4. The system of claim 1, the operations further comprising:
estimating a tracked bounding box associated with the tracked object over a period of time in which the vehicle is operating in the environment, the tracked bounding box indicative of the estimated size; and
determining, based at least in part on the first sensor data, a distorted bounding box associated with the object, the distorted bounding box contributable to the first sensor data including the distortion in the representation of the object,
wherein determining the bounding box associated with the object is further based at least in part on a difference between the distorted bounding box and the tracked bounding box.

5. A method comprising:
receiving sensor data including a representation of a portion of an object, the sensor data generated by a temporal sensor of a vehicle, wherein a movement of at least one of the object or the vehicle contributes to a distortion in the representation of the object;
determining, based on additional sensor data from a second sensor associated with the vehicle, different from the temporal sensor, a classification of the object;
determining, based at least in part on the classification, an estimated size of the portion of the object;
determining a difference between the estimated size and a detected size of the representation of the portion of the object;
determining at least one of a velocity or a bounding box associated with the object based at least in part on the difference; and
controlling operation of the vehicle based at least in part on the at least one of the velocity or the bounding box.

6. The method of claim 5, wherein determining the estimated size of the portion of the object further comprises:
determining, based at least in part on the sensor data, that the object corresponds with a tracked object, the tracked object associated with the estimated size determined based at least in part on previously received sensor data.

7. The method of claim 5, wherein the classification of the object is a type of vehicle, and determining the estimated size of the portion of the object comprises:
determining a vehicle model associated with the type of vehicle; and
obtaining size information associated with the vehicle model, the size information including an actual size of a portion of the type of vehicle that corresponds with the portion of the object.

8. The method of claim 5, further comprising:
determining a length of a period of time associated with the temporal sensor scanning the portion of the object, wherein determining the at least one of the velocity or the bounding box is further based at least in part on the length of the period of time.

9. The method of claim 5, further comprising:
determining, based at least in part on the sensor data, an angular width associated with the portion of the object, wherein determining the at least one of the velocity or the bounding box is further based at least in part on the angular width.

10. The method of claim 5, wherein the distortion in the representation of the portion of the object is relative to an actual shape of the portion of the object, a magnitude of the distortion being proportional to the velocity associated with the object or the vehicle.

11. The method of claim 5, wherein the temporal sensor comprises at least one of a rotating lidar sensor or a rolling shutter image sensor, and wherein the sensor data comprises at least one of lidar data or image data.

12. The method of claim 5, wherein the difference between the estimated size of the portion of the object and the detected size of the representation of the portion of the object is a difference between an estimated width of the portion of the object and a detected width of the representation of the portion of the object.

13. The method of claim 5, wherein the determining the at least one of the velocity or the bounding box associated with the object comprises determining a velocity value of a component of a velocity vector associated with the object, the component being perpendicular to a line of sight associated with the temporal sensor.

14. The method of claim 5, wherein:
second sensor is of a vision modality, and
size information indicative of the estimated size of the portion of the object is obtained from a database accessible to a computing device of the vehicle, the database storing respective size information associated with multiple respective objects.

15. One or more non-transitory computer-readable media storing instructions that, when executed, cause one or more computing devices to perform operations comprising:
receiving first sensor data during a first time period including a representation of a portion of an object, the first sensor data generated by a temporal sensor of a vehicle, wherein a movement of at least one of the object or the vehicle contributes to a distortion in the representation of the portion of the object;
determining, based on second sensor data captured during a second time period prior to the first time period, an estimated size of the portion of the object;
determining a difference between the estimated size and a detected size of the representation of the portion of the object;
determining at least one of a velocity or a bounding box associated with the object based at least in part on the difference; and
controlling operation of the vehicle based at least in part on the at least one of the velocity or the bounding box.

16. The one or more non-transitory computer-readable media of claim 15, wherein determining the estimated size of the portion of the object comprises:
determining, based at least in part on the first sensor data, that the object corresponds with a tracked object, the tracked object associated with the estimated size determined based at least in part on second sensor data.

17. The one or more non-transitory computer-readable media of claim 15, wherein the object is a type of vehicle and determining the estimated size of the portion of the object comprises:
determining a vehicle model associated with the type of vehicle; and
obtaining size information associated with the vehicle model, the size information including an actual size of a portion of the type of vehicle that corresponds with the portion of the object.

18. The one or more non-transitory computer-readable media of claim 15, the operations further comprising determining a length of a period of time associated with the temporal sensor scanning the portion of the object, wherein determining the at least one of the velocity or the bounding box is further based at least in part on the length of the period of time.

19. The one or more non-transitory computer-readable media of claim 15, the operations further comprising:
determining, based at least in part on the first sensor data, an angular width associated with the portion of the object, wherein determining the at least one of the velocity or the bounding box is further based at least in part on the angular width.

20. The one or more non-transitory computer-readable media of claim 15, wherein the distortion in the representation of the portion of the object is relative to an actual shape or size of the portion of the object, a magnitude of the distortion being proportional to the velocity associated with the object or the vehicle.

* * * * *